(12) United States Patent
Takahashi

(10) Patent No.: US 11,104,325 B2
(45) Date of Patent: Aug. 31, 2021

(54) HYBRID-VEHICLE CONTROLLER

(71) Applicant: Mitsubishi Electric Corporation, Tokyo (JP)

(72) Inventor: Tatsuhiko Takahashi, Hyogo (JP)

(73) Assignee: Mitsubishi Electric Corporation, Tokyo (JP)

(*) Notice: Subject to any disclaimer, the term of this patent is extended or adjusted under 35 U.S.C. 154(b) by 237 days.

(21) Appl. No.: 16/510,092

(22) Filed: Jul. 12, 2019

(65) Prior Publication Data

US 2020/0062236 A1 Feb. 27, 2020

(30) Foreign Application Priority Data

Aug. 27, 2018 (JP) .............................. JP2018-158019

(51) Int. Cl.
*B60W 20/13* (2016.01)
*B60W 10/08* (2006.01)
*B60W 10/06* (2006.01)
*B60W 20/30* (2016.01)

(52) U.S. Cl.
CPC ............ *B60W 20/13* (2016.01); *B60W 10/06* (2013.01); *B60W 10/08* (2013.01); *B60W 20/30* (2013.01)

(58) Field of Classification Search
CPC ...... B60W 20/13; B60W 10/06; B60W 10/08; B60W 20/30; B60W 20/20
See application file for complete search history.

(56) References Cited

U.S. PATENT DOCUMENTS

2002/0062183 A1* 5/2002 Yamaguchi ........... B60W 20/10
701/22
2004/0251065 A1* 12/2004 Komiyama ........... B60W 10/06
180/65.23

FOREIGN PATENT DOCUMENTS

JP 2016-193686 A 11/2016

* cited by examiner

*Primary Examiner* — James J Lee
*Assistant Examiner* — Steven Vu Nguyen
(74) *Attorney, Agent, or Firm* — Sughrue Mion, PLLC; Richard C. Turner

(57) ABSTRACT

There is provided a hybrid-vehicle controller that can calculate MG demand torque with which fuel consumption in an engine can efficiently be decreased by increasing the MG's power-running torque. In the hybrid-vehicle controller, from a plurality of MG torque candidate values, there are selected the MG torque candidate values that make a 0 MG-torque-reference total supply power variation amount become the same as or smaller than a power-running-side variation amount upper limit value; then, there is selected, as a power-running-side final MG torque candidate value, the MG torque candidate value that makes an absolute value of the relative supply power variation amount ratio become maximum, among the selected MG torque candidate values.

18 Claims, 7 Drawing Sheets

| i | −Ng | ... | 0 | ... | Nm |
|---|---|---|---|---|---|
| Tmg_c[i] | Tmg_min | ... | 0 | ... | Tmg_max |
| Teng_c[i] | ○○ | ... | Tsum | ... | ○○ |
| Peng_o[i] | ○○ | ... | ○○ | ... | ○○ |
| Feng[i] | ○○ | ... | ○○ | ... | ○○ |
| Peng_s[i] | ○○ | ... | ○○ | ... | ○○ |
| Pmg_o[i] | ○○ | ... | ○○ | ... | ○○ |
| Fmg[i] | ○○ | ... | ○○ | ... | ○○ |
| Pmg_s[i] | ○○ | ... | ○○ | ... | ○○ |
| Psum_s[i] | ○○ | ... | ○○ | ... | ○○ |
| DPeng0_s[i] | ○○ | ... | 0 | ... | ○○ |
| DPmg0_s[i] | ○○ | ... | 0 | ... | ○○ |
| DPsum0_s[i] | ○○ | ... | 0 | ... | ○○ |
| RDP0_s[i] | ○○ | ... | − | ... | ○○ |

HYBRID-VEHICLE CONTROLLER

INCORPORATION BY REFERENCE

The disclosure of Japanese Patent Application No. 2018-158019 filed on Aug. 27, 2018 including its specification, claims and drawings, is incorporated herein by reference in its entirety.

BACKGROUND

The present disclosure relates to a hybrid-vehicle controller.

To date, there has been known a hybrid vehicle provided with an internal combustion engine (hereinafter, referred to as an engine) and a motor generator (hereinafter, referred to as an MG), as a driving power source for the vehicle.

In a technology disclosed in JP 2016-193686 A, each of energy consumption amounts in a plurality of energy sources is converted into a common evaluation index; then, an evaluation index in which the respective evaluation indexes are added is calculated. Then, in the technology disclosed in JP 2016-193686 A, in the case where a plurality of driving power generation devices output a vehicle demand output, respective operation conditions, for the plurality of driving power generation devices, that optimize the evaluation index are obtained; then, the obtained operation conditions are set to the respective target values for the plurality of driving power generation devices.

SUMMARY

In the technology disclosed in JP 2016-193686 A, because in a hybrid vehicle utilizing an engine and an MG as a plurality of driving power generation devices, the MG's efficiency in conversion from an electric power into a power-running-side output is higher than the engine's efficiency (thermal efficiency) in conversion from a fuel into an output, the summation value of the respective common evaluation indexes of the engine and the MG more approaches the optimal value, i.e., the minimum value, as the ratio of the MG's power-running-side output to the engine's output becomes larger. Accordingly, when the ratio of the MG's power-running-side output is made large, the total energy consumption amount in the engine and the MG can be reduced in a short term. However, because when the ratio of the MG's power-running-side output is made large, the charging amount in the electric storage device shortly decreases, it is required to increase the output of the engine and the MG is made to generate electric power so that the electric storage device is charged; as a result, the energy consumption amount increases. Therefore, in the technology disclosed in JP 2016-193686 A, there has been a problem that in a long term, the increase in the MG's power-running-side output causes the fuel consumption amount of the engine to increase and hence the gasoline mileage is deteriorated.

Accordingly, it is desired to provide a hybrid-vehicle controller that can calculate an MG demand torque with which the fuel consumption amount of the engine can efficiently be decreased by increasing the MG's power-running torque, or that can calculate an MG demand torque with which the MG's power-generation amount can efficiently be increased by increasing the engine's fuel consumption.

A first hybrid-vehicle controller according to the present disclosure controls a hybrid vehicle having an engine and a motor generator as a driving power source for wheels; the hybrid-vehicle controller includes;

a transmission shaft torque calculation unit that calculates transmission shaft torque, which is a demand torque to be transferred from the engine and the motor generator to a transmission shaft that is coupled with the wheels;

a torque candidate value setting unit that sets a plurality of MG torque candidate values including 0, which are power-running-side demand torque candidate values for the motor generator, and sets respective engine torque candidate values, which are engine demand torque candidate values for realizing the transmission shaft torque, for the plurality of MG torque candidate values;

an engine supply power calculation unit that calculates, for each of the plurality of MG torque candidate values, an engine supply fuel power, which is a power of a fuel that is supplied to the engine for realizing the engine torque candidate value corresponding to the MG torque candidate value, based on a present rotation speed of the engine and a fuel consumption rate of the engine;

an MG supply power calculation unit that calculates, for each of the plurality of MG torque candidate values, an MG supply electric power, which is an electric energy that is converted by the motor generator for realizing the MG torque candidate value, based on a present rotation speed of the motor generator and a conversion efficiency of the motor generator;

a total supply power calculation unit that calculates, for each of the plurality of MG torque candidate values, a value obtained by summing up the MG supply electric power corresponding to the MG torque candidate value and the engine supply fuel power corresponding to the MG torque candidate value, as a total supply power;

an engine supply variation amount calculation unit that calculates, for each of the plurality of MG torque candidate values, a value obtained by subtracting the engine supply fuel power corresponding to the 0 MG-torque candidate value from the engine supply fuel power corresponding to the MG torque candidate value, as a 0 MG-torque-reference engine supply fuel power variation amount;

an MG supply variation amount calculation unit that calculates, for each of the plurality of MG torque candidate values, a value obtained by subtracting the MG supply electric power corresponding to the 0 MG-torque candidate value from the MG supply electric power corresponding to the MG torque candidate value, as a 0 MG-torque-reference MG supply electric power variation amount;

a total supply variation amount calculation unit that calculates, for each of the plurality of MG torque candidate values, a value obtained by subtracting the total supply power corresponding to the 0 MG-torque candidate value from the total supply power corresponding to the MG torque candidate value, as a 0 MG-torque-reference total supply power variation amount;

a supply variation amount ratio calculation unit that calculates, for each of the plurality of MG torque candidate values, a relative supply power variation amount ratio, which is a ratio of the 0 MG-torque-reference engine supply fuel power variation amount corresponding to the MG torque candidate value to the 0 MG-torque-reference MG supply electric power variation amount corresponding to the MG torque candidate value; and a demand torque selection unit that selects the MG torque candidate values that make the 0 MG-torque-reference total supply power variation amount become the same as or smaller than a power-running-side variation amount upper limit value, among the plurality of power-running-side MG torque candidate values; selects, as a power-running-side final MG torque candidate value, the MG torque candidate value that makes an absolute value of the relative supply power variation amount ratio become maximum, among the selected MG torque candidate values; sets the power-running-side final MG torque candidate value to a final demand torque for the motor generator; and sets, as a final demand torque for the engine, a value obtained by subtracting the final demand torque for the motor generator from the transmission shaft torque.

A second hybrid-vehicle controller according to the present disclosure controls a hybrid vehicle having an engine and a motor generator as a driving power source for wheels; the hybrid-vehicle controller includes:

a transmission shaft torque calculation unit that calculates a transmission shaft torque, which is a demand torque to be transferred from the engine and the motor generator to a wheels-side transmission shaft;

a torque candidate value setting unit that sets a plurality of MG torque candidate values including 0, which are power-generation-side demand torque candidate values for the motor generator, and sets respective engine torque candidate values, which are engine demand torque candidate values for realizing the transmission shaft torque, for the plurality of MG torque candidate values;

an engine supply power calculation unit that calculates, for each of the plurality of MG torque candidate values, an engine supply fuel power, which is a power of a fuel that is supplied to the engine for realizing the engine torque candidate value corresponding to the MG torque candidate value, based on a present rotation speed of the engine and a fuel consumption rate of the engine;

an MG supply power calculation unit that calculates, for each of the plurality of MG torque candidate values, an MG supply electric power, which is an electric energy that is converted by the motor generator for realizing the MG torque candidate value, based on a present rotation speed of the motor generator and a conversion efficiency of the motor generator;

a total supply power calculation unit that calculates, for each of the plurality of MG torque candidate values, a value obtained by summing up the MG supply electric power corresponding to the MG torque candidate value and the engine supply fuel power corresponding to the MG torque candidate value, as a total supply power;

an engine supply variation amount calculation unit that calculates, for each of the plurality of MG torque candidate values, a value obtained by subtracting the engine supply fuel power corresponding to the 0 MG-torque candidate value from the engine supply fuel power corresponding to the MG torque candidate value, as a 0 MG-torque-reference engine supply fuel power variation amount;

an MG supply variation amount calculation unit that calculates, for each of the plurality of MG torque candidate values, a value obtained by subtracting the MG supply electric power corresponding to the 0 MG-torque candidate value from the MG supply electric power corresponding to the MG torque candidate value, as a 0 MG-torque-reference MG supply electric power variation amount;

a total supply variation amount calculation unit that calculates, for each of the plurality of MG torque candidate values, a value obtained by subtracting the total supply power corresponding to the 0 MG-torque candidate value from the total supply power corresponding to the MG torque candidate value, as a 0 MG-torque-reference total supply power variation amount;

a supply variation amount ratio calculation unit that calculates, for each of the plurality of MG torque candidate values, a relative supply power variation amount ratio, which is a ratio of the 0 MG-torque-reference engine supply fuel power variation amount corresponding to the MG torque candidate value to the 0 MG-torque-reference MG supply electric power variation amount corresponding to the MG torque candidate value; and a demand torque selection unit that selects the MG torque candidate values that make the 0 MG-torque-reference total supply power variation amount become the same as or smaller than a power-generation-side variation amount upper limit value, among the plurality of power-generation-side MG torque candidate values; selects, as a power-generation-side final MG torque candidate value, the MG torque candidate value that makes an absolute value of the relative supply power variation amount ratio become minimum, among the selected MG torque candidate values; sets the power-generation-side final MG torque candidate value to a final demand torque for the motor generator; and sets, as a final demand torque for the engine, a value obtained by subtracting the final demand torque for the motor generator from the transmission shaft torque.

A third hybrid-vehicle controller according to the present disclosure controls a hybrid vehicle having an engine and a motor generator as a driving power source for wheels; the hybrid-vehicle controller includes:

a transmission shaft torque calculation unit that calculates a transmission shaft torque, which is a demand torque to be transferred from the engine and the motor generator to a wheels-side transmission shaft;

a torque candidate value setting unit that sets a plurality of MG torque candidate values including 0, which are power-running-side and power-generation-side demand torque candidate values for the motor generator, and sets respective engine torque candidate values, which are engine demand torque candidate values for realizing the transmission shaft torque, for the plurality of MG torque candidate values;

an engine supply power calculation unit that calculates, for each of the plurality of MG torque candidate values, an engine supply fuel power, which is a power of a fuel that is supplied to the engine for realizing the engine torque candidate value corresponding to the MG torque candidate value, based on a present rotation speed of the engine and a fuel consumption rate of the engine;

an MG supply power calculation unit that calculates, for each of the plurality of MG torque candidate values, an MG supply electric power, which is an electric energy that is converted by the motor generator for realizing the MG torque candidate value, based on a present rotation speed of the motor generator and a conversion efficiency of the motor generator;

a total supply power calculation unit that calculates, for each of the plurality of MG torque candidate values, a value obtained by summing up the MG supply electric power corresponding to the MG torque candidate value and the engine supply fuel power corresponding to the MG torque candidate value, as a total supply power;

an engine supply variation amount calculation unit that calculates, for each of the plurality of MG torque candidate values, a value obtained by subtracting the engine supply fuel power corresponding to the 0 MG-torque candidate value from the engine supply fuel power corresponding to the MG torque candidate value, as a 0 MG-torque-reference engine supply fuel power variation amount;

an MG supply variation amount calculation unit that calculates, for each of the plurality of MG torque candidate values, a value obtained by subtracting the MG supply electric power corresponding to the 0 MG-torque candidate value from the MG supply electric power corresponding to the MG torque candidate value, as a 0 MG-torque-reference MG supply electric power variation amount;

a total supply variation amount calculation unit that calculates, for each of the plurality of MG torque candidate values, a value obtained by subtracting the total supply power corresponding to the 0 MG-torque candidate value from the total supply power corresponding to the MG torque candidate value, as a 0 MG-torque-reference total supply power variation amount;

a supply variation amount ratio calculation unit that calculates, for each of the plurality of MG torque candidate values, a relative supply power variation amount ratio, which is a ratio of the 0 MG-torque-reference engine supply fuel power variation amount corresponding to the MG torque candidate value to the 0 MG-torque-reference MG supply electric power variation amount corresponding to the MG torque candidate value; and a demand torque selection unit that selects the MG torque candidate values that make the 0 MG-torque-reference total supply power variation amount become the same as or smaller than a power-running-side variation amount upper limit value, among the plurality of power-running-side MG torque candidate values; selects, as a power-running-side final MG torque candidate value, the MG torque candidate value that makes an absolute value of the relative supply power variation amount ratio become maximum, among the selected MG torque candidate values; selects the MG torque candidate values that make the 0 MG-torque-reference total supply power variation amount become the same as or smaller than a power-generation-side variation amount upper limit value, among the plurality of power-generation-side MG torque candidate values; selects, as a power-generation-side final MG torque candidate value, the MG torque candidate value that makes an absolute value of the relative supply power variation amount ratio become minimum, among the selected MG torque candidate values; sets one of the power-running-side final MG torque candidate value and the power-generation-side final MG torque candidate value, whose the 0 MG-torque-reference total supply power variation amount becomes smaller than that of the other one, to a final demand torque for the motor generator; and sets, as a final demand torque for the engine, a value obtained by subtracting the final demand torque for the motor generator from the transmission shaft torque.

According to the first hybrid-vehicle controller of the present disclosure, by power running of the MG, rather than the case where the MG torque is 0, it is possible to select an MG torque candidate value that makes the energy consumption amount in the overall engine MG become lower than the power-running-side variation amount upper limit value; thus, by setting at least to what extent the energy consumption amount in the overall engine MG is reduced by the power-running torque, it is possible to set at least to what extent the power-running torque is increased. Then, by selecting the MG torque candidate value that makes the absolute value of the relative supply power variation amount ratio become maximum among the selected MG torque candidate values, it is possible to select, among the selected MG torque candidate values, an MG torque candidate value that the fuel consumption in the engine is most efficiently reduced by increasing the MG's power-running torque, as the power-running-side final MG torque candidate value, and set it to the MG demand torque.

According to the second hybrid-vehicle controller of the present disclosure, by power generation of the MG, rather than the case where the MG torque is 0, it is possible to select an MG torque candidate value that makes the energy consumption amount in the overall engine MG become the same as or smaller than the power-generation-side variation amount upper limit value; thus, by setting at least to what extent the energy consumption amount in the overall engine MG is increased by the power-generation torque, it is possible to set at least to what extent the power-generation torque is increased. Then, by selecting the MG torque candidate value that makes the absolute value of the relative supply power variation amount ratio become minimum, it is possible to select, among the selected MG torque candidate values, an MG torque candidate value that makes it possible that the MG's power-generation amount is most efficiently increased by increasing the fuel consumption in the engine, as the power-generation-side final MG torque candidate value, and set it to the MG demand torque.

According to the third hybrid-vehicle controller of the present disclosure, among the power-running-side final MG torque candidate value selected by the first hybrid-vehicle controller and the power-generation-side final MG torque candidate value selected by the second hybrid-vehicle controller, one whose the 0 MG-torque-reference total supply power variation amount become smaller than that of the other one is finally selected and set to the MG demand torque; thus, the energy consumption amount in the overall engine MG can further be reduced.

DETAILED DESCRIPTION OF THE EMBODIMENTS

Embodiment 1

Figure 1:
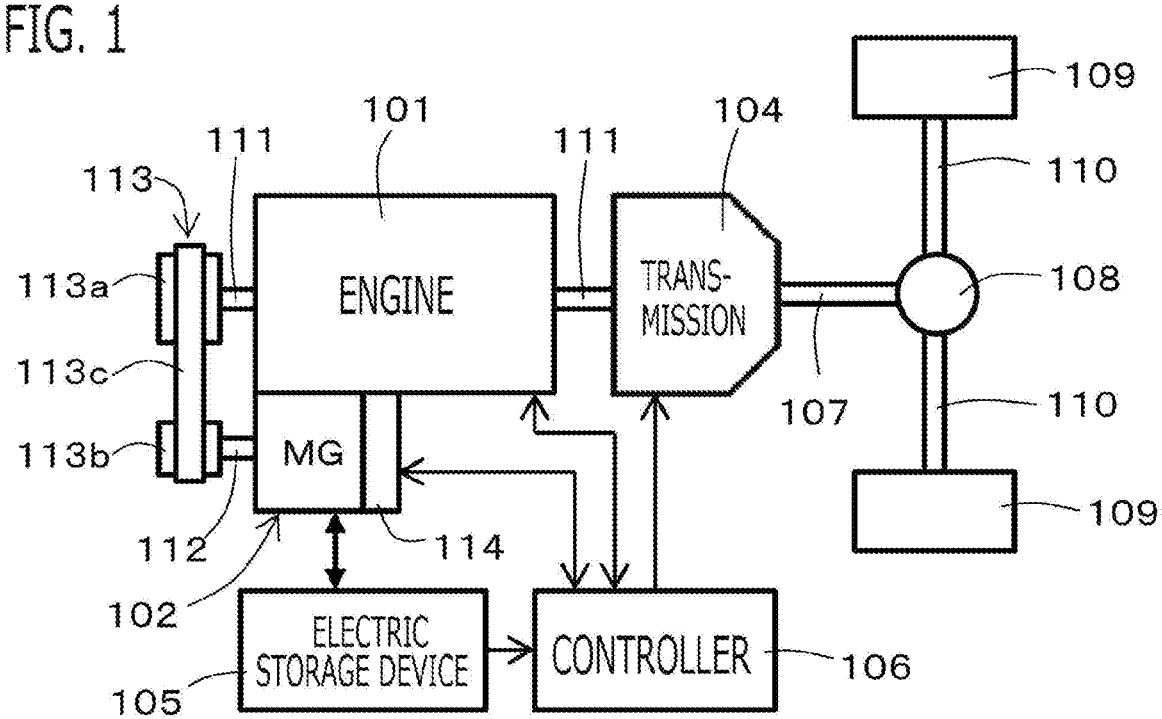
FIG. 1 is a schematic configuration diagram of a hybrid vehicle according to Embodiment 1.

A hybrid-vehicle controller 106 (hereinafter, referred to simply as a controller 106) according to Embodiment 1 will be explained with reference to drawings. FIG. 1 is a schematic configuration diagram of a hybrid vehicle according to Embodiment 1. The hybrid vehicle has an engine 101 and a motor generator 102 (hereinafter, referred to as an MG 102), as a driving power source for wheels 109.

1. Configuration of Hybrid Vehicle

The engine 101 is an internal combustion engine; torque generated though combustion of a fuel supplied into a cylinder is outputted to a crankshaft 111. The engine 101 is provided with an injector for supplying a fuel, an electric throttle valve for adjusting an intake air amount to be supplied to the cylinder, various kinds of actuators such as an ignition coil for igniting a fuel-air mixture in the cylinder and the like, and various kinds of sensors such as a crankshaft angle sensor and an air flow sensor; these devices are connected with the controller 106.

The MG 102 is an AC synchronous MG; the stator is provided with a three-phase winding; the rotor is provided with a magnetic-field winding. It may be allowed that the rotor is provided with a permanent magnet instead of the magnetic-field winding. The MG 102 is provided with an inverter that performs electric-power conversion between the three-phase winding and an electric storage device 105. The MG 102 is capable of outputting power-running torque and power-generation torque.

The MG 102 is provided with an MG controller 114 for controlling the MG 102. The MG 102 is provided with a rotation angle sensor for detecting the rotation angle of the rotor, a current sensor for detecting a current flowing in the three-phase winding, a voltage sensor for detecting a voltage of a DC power source, and the like; these devices are connected with the MG controller 114. The MG controller 114 is provided with an MG control unit 213 (refer to FIG. 2); the MG control unit 213 performs on/off-control of a plurality of switching devices provided in the inverter and a switching device that performs on/off-switching of electric-power supply to the magnetic-field winding so that the MG 102 outputs demand torque transferred from the controller 106. As is the case with the controller 106, described later, the MG controller 114 is provided with a computing processer such as a CPU, storage devices such as a RAM and a ROM, an input device, an output device, a communication apparatus, and the like.

The hybrid vehicle has the electric storage device 105 that exchanges electric energy with the MG 102. The electric storage device 105 stores electric power generated by the MG 102 and supplies the electric power to various kinds of electric loads provided in the hybrid vehicle. As the electric storage device 105, for example, a lead-acid battery, a lithium ion battery, a nickel-hydrogen battery, an electric double layer capacitor, or the like is utilized. It may be allowed that the electric storage device 105 is provided with a DC power conversion apparatus that steps up and steps down a DC voltage. The electric storage device 105 is provided with a current sensor for detecting charging and discharging currents; the current sensor is connected with the controller 106.

In the present embodiment, an output axle 112 of the MG is coupled with the crankshaft 111 of the engine 101 at a fixed pulley ratio Rply, through the intermediary of a pulley belt mechanism 113. The pulley belt mechanism 113 includes a pulley 113a coupled with the crankshaft 111, a pulley 113b coupled with the output axle 112, and a belt 113c installed over the two pulleys. The total driving power of the engine 101 and the MG 102 is transferred to the crankshaft 111.

The hybrid vehicle has a transmission 104. The transmission 104 shifts the speed of rotation driving power transferred to the input axle and transfers the rotation driving power to a propeller shaft 107. The input axle is coupled with the crankshaft 111. The transmission 104 is a stepped or unstepped automatic transmission. The transmission 104 is provided with actuators such as a hydraulic pressure control solenoid valve and the like and sensors such as a shift position sensor and the like; these devices are connected with the controller 106. The propeller shaft 107 is coupled with the left and right wheels 109 through the intermediary of a differential 108 and two drive shafts 110.

2. Configuration of Controller

Figure 2:
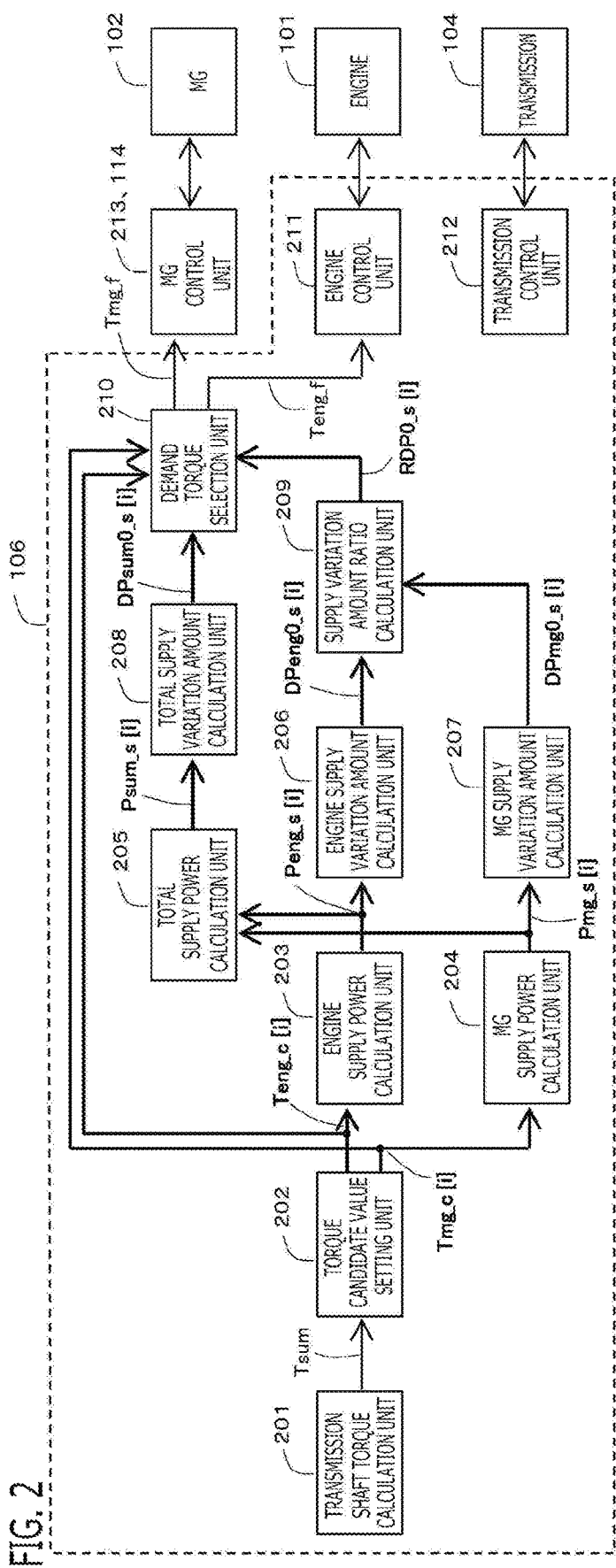
FIG. 2 is a block diagram of a hybrid-vehicle controller according to Embodiment 1.

As illustrated in FIG. 2, the controller 106 has control units such as a transmission shaft torque calculation unit 201, a torque candidate value setting unit 202, an engine supply power calculation unit 203, an MG supply power calculation unit 204, a total supply power calculation unit 205, an engine supply variation amount calculation unit 206, an MG supply variation amount calculation unit 207, a total supply variation amount calculation unit 208, a supply variation amount ratio calculation unit 209, a demand torque selection unit 210, an engine control unit 211, a transmission control unit 212, and the like. The respective control units 201 through 212 and the like of the controller 106 are realized by processing circuits provided in the controller 106. Specifically, the controller 106 includes, as the processing circuits, a computing processor (computer) such as a CPU (Central Processer), storage devices that exchange data with the computing processor, an input circuit that inputs external signals to the computing processor, an output circuit that outputs signals from the computing processor to the outside, a communication circuit that performs communication with external controllers, e.g., the MG controller 114, and the like. As the storage devices, a RAM (Random Access Memory), a ROM (Read Only Memory), and the like are provided. The input circuit is connected with various kinds of sensors and the like and is provided with an A/D converter and the like for inputting output signals from the sensors to the computing processor. The output circuit is connected with electric loads and is provided with a driving circuit and the like for outputting control signals from the computing processor to these electric loads.

In addition, the computing processer runs software items (programs) stored in the storage apparatus such as a ROM and collaborates with other hardware devices in the controller 106, such as the storage apparatus, the input circuit, and the output circuit, so that the respective functions of the control units 201 through 212 provided in the controller 106 are realized. Setting data items such as setting values and map data to be utilized in the control units 201 through 212 are stored, as part of software items (programs), in the storage apparatus such as a ROM. Data items on respective calculation values and respective detection values such as a torque candidate value, power, a power variation amount, and a power variation amount rate calculated by the control units 201 through 212 are stored in a rewritable storage device such as a RAM.

The input circuit is connected with sensors of the engine 101 such as a crank angle sensor and an air flow sensor, sensors of the transmission 104 such as a shift position sensor and the like, an accelerator position sensor, a vehicle speed sensor, a charging/discharging current sensor, and the like. Based on the respective output signals from the sensors, the controller 106 detects a rotation angle and a rotation speed Neng of the engine (crankshaft 111), an intake air amount of the engine, a shift position, an accelerator position, a vehicle speed, a driving state such as charging and discharging currents of the electric storage device 105, and the like. Based on the charging and discharging currents of the electric storage device 105, the controller 106 estimates a charging amount SOC of the electric storage device 105.

The output circuit is connected with an injector, an ignition coil, actuators of the engine 101 such as an electric throttle valve and the like, and actuators of the transmission 104 such as a hydraulic pressure control solenoid valve and the like; the controller 106 drives the respective actuators, based on command values.

The engine control unit 211 calculates the intake air amount, the fuel injection amount, and the ignition timing for realizing engine demand torque transferred from the demand torque selection unit 210; then, in order to realize these items, the engine control unit 211 controls the electric throttle valve, the injector, the ignition coil, and the like, based on the detected engine driving state.

Based on the accelerator position, the vehicle speed, and the like, the transmission control unit 212 calculates a target gear step or a target transmission ratio, and then controls the hydraulic pressure control solenoid valve and the like so as to realize the target gear step or the target transmission ratio.

2-1. Calculation Control of Engine/Mg Demand Torque 2-1-1. Transmission Shaft Torque Calculation Unit 201

The transmission shaft torque calculation unit 201 calculates a transmission shaft torque Tsum, which is a demand torque to be transferred to the transmission shaft that is coupled with the wheels 109 from the engine 101 and the MG 102. In the present embodiment, the transmission shaft is the crankshaft 111. The transmission shaft torque calculation unit 201 calculates the transmission shaft torque Tsum, based on the accelerator position, the vehicle speed, and the like.

2-1-2. Torque Candidate Value Setting Unit 202

The torque candidate value setting unit 202 sets a plurality of MG torque candidate values Tmg_c, including 0, which are demand torque candidate values for the MG 102. In the present embodiment, the torque candidate value setting unit 202 sets a plurality of MG torque candidate values Tmg_c that are the same as or larger than 0, and sets a plurality of MG torque candidate values Tmg_c that are the same as or smaller than 0.

The MG torque candidate values Tmg_c and respective MG torque values are each converted into MG torque values that are transferred to the crankshaft 111, which is the transmission shaft, i.e., the values that are each obtained by multiplying torque transferred to the output axle of the MG by the pulley ratio Rply of the pulley belt mechanism 113. The pulley ratio Rply is a value obtained by dividing the diameter of the pulley 113a at the engine side by the diameter of the pulley 113b at the MG side.

The torque candidate value setting unit 202 sets a plurality of MG torque candidate values Tmg_c, including 0, in the range from negative-value power-generation-side lower limit torque Tmg_min to positive-value power-running-side upper limit torque Tmg_max. The power-generation-side lower limit torque Tmg_min and the power-running-side upper limit torque Tmg_max are the maximum power-generation torque and the maximum power-running torque, respectively, that can be outputted by the MG 102 and are set in accordance with the rotation speed Nmg of the MG. As the rotation speed Nmg of the MG, the torque candidate value setting unit 202 calculates a value obtained by multiplying the rotation speed Neng of the engine by the pulley ratio Rply.

Figures 3, 4:
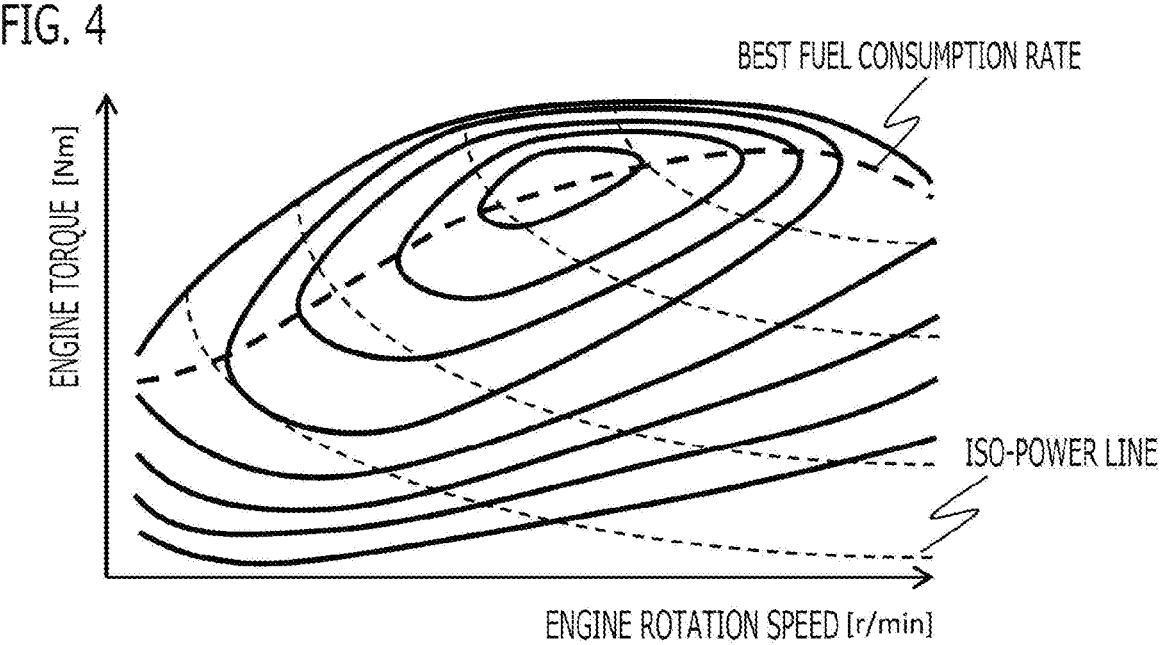
FIG. 3 is a table for explaining calculation values that are made to correspond to candidate numbers i and are stored in a storage device, according to Embodiment 1.
FIG. 4 is a graph for explaining an example of map data on the fuel consumption rate of an engine according to Embodiment 1.

As represented by the following equations, the power-generation-side torque range from Tmg_min to 0 is sectioned by a power-generation-side number Ng, and then Ng power-generation-side MG torque candidate values Tmg_c are set; the power-running-side torque range from 0 to Tmg_max is sectioned by a power-running-side number Nm, and then Nm power-running-side MG torque candidate values Tmg_c are set. Accordingly, the number of the MG torque candidate values Tmg_c is Nm+Ng+1 that is obtained by summing up the power-running-side number Nm, the power-generation-side number Ng, and 1 (0 torque). Each of the MG torque candidate values Tmg_c is managed with a candidate number i; the candidate number i increases in steps of 1 from −Ng to Nm; at i=−NG, Tmg_c=Tmg_min; at i=0, Tmg_c=0; at i=Nm, Tmg_c=Tmg_max. As represented in FIG. 3, the MG torque candidate values Tmg_c are made to correspond to the respective candidate numbers i and are stored in a rewritable storage device such as a RAM in the controller 106.

$i=-Ng,-Ng+1,\ldots,0,\ldots,Nm-1,Nm$

1) In the case where i is smaller than 0, i.e., in the case of the power-generation side:

$Tmg\_c[i]=Tmg\_\min/Ng\times(-i)$

2) In the case where i is 0, i.e., in the case where the torque is 0:

$Tmg\_c[i]=0$

3) In the case where i is larger than 0, i.e., in the case of the power-running side:

$$Tmg\_c[i]=Tmg\_\max/Nm\times i \quad (1)$$

Then, the torque candidate value setting unit 202 sets respective engine torque candidate values Teng_c, which are engine demand torque candidate values for realizing the transmission shaft torque Tsum, for the plurality of MG torque candidate values Tmg_c. Specifically, as represented in the next equation, the torque candidate value setting unit 202 sets the engine torque candidate values Teng_c to a value obtained by subtracting the MG torque candidate value Tmg_c from the transmission shaft torque Tsum, for each of the candidate numbers i. In the case where the engine torque candidate value Teng_c is not within the range of torque that can be outputted by the engine, the particular engine torque candidate value Teng_c and the MG torque candidate value Tmg_c are excluded from the candidate values. As represented in FIG. 3, the engine torque candidate values Teng_c are made to correspond to the respective candidate numbers i and are stored in a rewritable storage device such as a RAM in the controller 106. As represented in FIG. 3, after-mentioned calculation values are also made to correspond to the respective candidate numbers i and are stored in a RAM or the like.

$$Teng\_c[i]=Tsum-Tmg\_c[i] \quad (2)$$

2-1-3. Engine Supply Power Calculation Unit 203

Based on the present rotation speed Neng of the engine and the fuel consumption rate Feng of the engine, the engine supply power calculation unit 203 calculates an engine supply fuel power Peng_s, which is a power of a fuel that is supplied to the engine 101 for realizing the engine torque candidate value Teng_c corresponding to the MG torque candidate value Tmg_c, for each of the plurality of MG torque candidate values Tmg_c.

In the present embodiment, as represented in the next equation, based on the present rotation speed Neng[r/min] of the engine, the engine supply power calculation unit 203 calculates an engine output power Peng_o[kW], which is a mechanical energy to be outputted to the crankshaft 111 based on the engine torque candidate value Teng_c[Nm], for each of the respective candidate numbers i.

$$Peng\_o[i]=Teng\_c[i]\times(Neng\times 2\pi/60)/1000 \quad (3)$$

Then, as represented in the next equation, with regard to each of the respective candidate numbers i, the engine supply power calculation unit 203 refers to a map data MAPfeng in which the relationship among the engine torque, the rotation speed Neng of the engine, and the fuel consumption rate Feng of the engine is preliminarily set, and then calculates the fuel consumption rate Feng[g/kW·h] of the engine corresponding to the engine torque candidate value Teng_c and the present rotation speed Neng of the engine.

$$Feng[i]=MAPfeng(Teng\_c[i],Neng) \quad (4)$$

FIG. 4 represents examples of setting values in the map data MAPfeng. The setting values for the fuel consumption rate Feng[g/kW·h] of the engine are expressed by contour lines.

As represented in the next equation, based on the fuel consumption rate Feng[g/kW·h] of the engine and a fuel calorific value Cfuel[kJ/g], the engine supply power calculation unit 203 converts the engine output power Peng_o [kW] into the engine supply fuel power Peng_s[kW], for each of the respective candidate numbers i.

$$Peng\_s[i]=Peng\_o[i]\times Feng[i]\times Cfuel/3600 \quad (5)$$

2-1-4. Mg Supply Power Calculation Unit 204

Based on the present rotation speed Nmg of the MG and a conversion efficiency Fmg of the MG, the MG supply power calculation unit 204 calculates an MG supply electric power Pmg_s[kW], which is the electric energy that is converted by the MG 102 for realizing the MG torque candidate value Tmg_c, for each of the plurality of MG torque candidate values Tmg_c.

In the present embodiment, as represented in the next equations, based on the present rotation speed Nmg[r/min] of the MG, the MG supply power calculation unit 204 calculates an MG output power Pmg_o[kW], which is a mechanical energy to be outputted to the crankshaft 111 based on the MG torque candidate values Tmg_c, for each of the respective candidate numbers i.

$$Pmg\_o[i]=Tmg\_c[i]\times(Nmg/Rply\times 2\pi/60)/$$
$$1000 Nmg=Neng\times Rply \quad (6)$$

The rotation speed Nmg of the MG is the value obtained by multiplying the rotation speed Neng of the engine by the pulley ratio Rply; thus, instead of the rotation speed Nmg of the MG, the rotation speed Neng of the engine is utilized. Because already converted into the torque transferred to the crankshaft 111, the MG torque candidate values Tmg_c is not multiplied by the pulley ratio Rply.

Then, as represented in the next equation, with regard to each of the respective candidate numbers i, the MG supply power calculation unit 204 refers to a map data MAPfmg in which the relationship among the MG torque, the rotation speed Nmg of the MG, and the conversion efficiency Fmg of the MG is preliminarily set, and then calculates the conversion efficiency Fmg of the MG corresponding to the MG torque candidate value Tmg_c and the present rotation speed Nmg of the MG. In this situation, because the map data MAPfmg is set based on the MG torque to be transferred to the output axle 112 of the MG, the MG torque candidate values Tmg_c is converted into torque to be transferred to the output axle 112 of the MG by being divided by the pulley ratio Rply.

$$Fmg[i]=MAPfmg(Tmg\_c[i]/Rply,Nmg) \quad (7)$$

Figure 5:
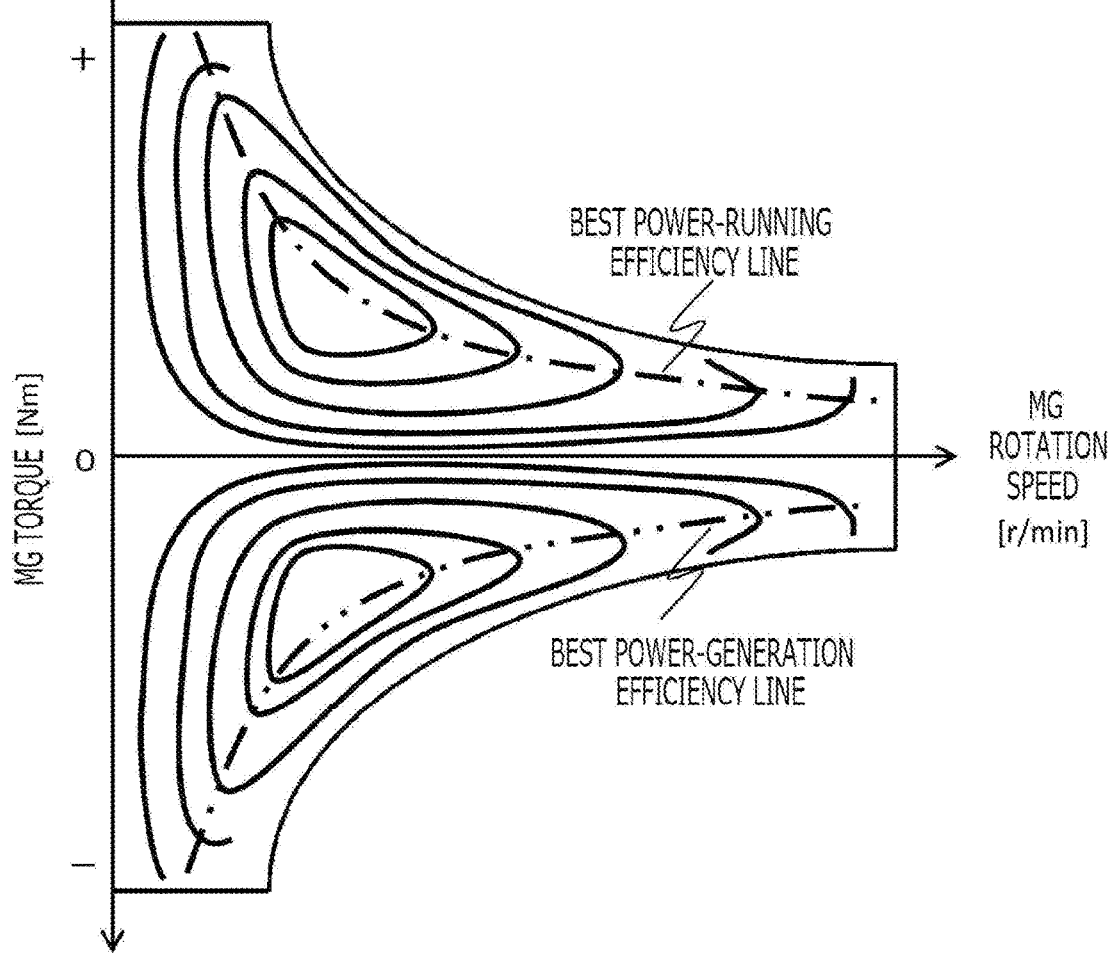
FIG. 5 is a graph for explaining an example of map data on the conversion efficiency of an MG according to Embodiment 1.

FIG. 5 represents examples of setting values in the map data MAPfmg. The setting values for the conversion efficiency Fmg of the MG are expressed by contour lines.

As represented in the next equations, based on the conversion efficiency Fmg of the MG, the MG supply power calculation unit 204 converts the MG output power Pmg_o [kW] into the MG supply electric power Pmg_s [kW], for each of the respective candidate numbers i. In this situation, the power-running-side conversion efficiency Fmg of the MG is a value obtained by dividing the output power by the electric power; the power-generation-side conversion efficiency Fmg of the MG is a value obtained by dividing the electric power by the output power. Accordingly, at the power-running side, the MG output power Pmg_o is divided by the conversion efficiency Fmg of the MG; at the power-generation-side, the MG output power Pmg_o is multiplied by the conversion efficiency Fmg of the MG.

1) In the case where Tmg_c[i] is the same as or larger than 0, i.e., in the case of the power-running side:

$$Pmg\_s[i]=Pmg\_o[i]/Fmg[i]$$

2) In the case where Tmg_c[i] is smaller than 0, i.e., in the case of the power-generation side:

$$Pmg\_s[i]=Pmg\_o[i]\times Fmg[i] \quad (8)$$

2-1-5. Total Supply Power Calculation Unit 205

As represented in the next equation, the total supply power calculation unit 205 calculates, for each of the plurality of MG torque candidate values Tmg_c (for each of the respective candidate numbers i), a value obtained by summing up the MG supply electric power Pmg_s[kW] corresponding to the MG torque candidate value Tmg_c and the engine supply fuel power Peng_s corresponding to the MG torque candidate value Tmg_c, as a total supply power Psum_s.

$$Psum\_s[i]=Pmg\_s[i]+Peng\_s[i] \quad (9)$$

2-1-6. Engine Supply Variation Amount Calculation Unit 206

As represented in the next equation, the engine supply variation amount calculation unit 206 calculates, for each of the plurality of MG torque candidate values Tmg_c (for each of the respective candidate numbers i), a value obtained by subtracting the engine supply fuel power Peng_s [0] corresponding to the 0 MG-torque candidate value Tmg_c[0] from the engine supply fuel power Peng_s corresponding to the MG torque candidate value Tmg_c, as a 0 MG-torque-reference engine supply fuel power variation amount DPeng0_s.

$$DPeng0\_s[i]=Peng\_s[i]-Peng\_s[0] \quad (10)$$

Figure 8:
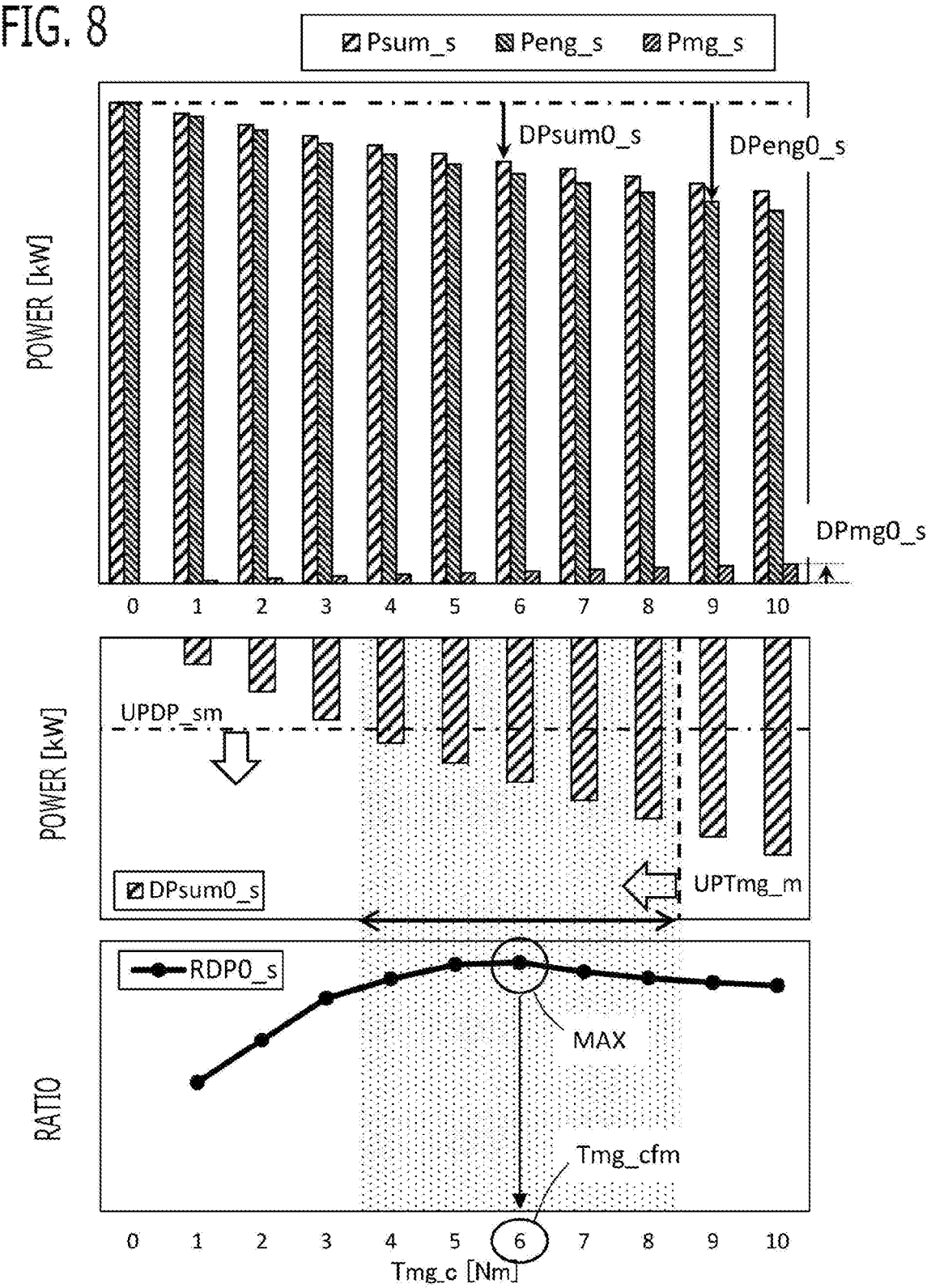
FIG. 8 is a set of charts for explaining the behavior of power-running-side demand torque selection processing according to Embodiment 1.

At the power-running side, the 0 MG-torque-reference engine supply fuel power variation amount DPeng0_s decreases from 0 as the MG torque candidate value Tmg_c increases from 0, and the consumed fuel energy becomes smaller than that in the case where the MG torque is 0 (refer to FIG. 8). At the power-generation side, the 0 MG-torque-reference engine supply fuel power variation amount DPeng0_s increases from 0 as the MG torque candidate values Tmg_c decreases from 0, and the consumed fuel energy becomes larger than that in the case where the MG torque is 0 (refer to FIG. 9).

2-1-7. Mg Supply Variation Amount Calculation Unit 207

As represented in the next equation, the MG supply variation amount calculation unit 207 calculates, for each of the plurality of MG torque candidate values Tmg_c (for each of the respective candidate numbers i), a value obtained by subtracting the MG supply electric power Pmg_s[0] corresponding to the 0 MG-torque candidate value Tmg_c [0] from the MG supply electric power Pmg_s corresponding to the MG torque candidate value Tmg_c, as a 0 MG-torque-reference MG supply electric power variation amount DPmg0_s.

$$DPmg0\_s[i]=Pmg\_s[i]-Pmg\_s[0] \quad (11)$$

At the power-running side, the 0 MG-torque-reference MG supply electric power variation amount DPmg0_s increases from 0 as the MG torque candidate value Tmg_c increases from 0, and the power consumption becomes larger than that in the case where the MG torque is 0 (refer to FIG. 8). At the power-generation side, the 0 MG-torque-reference MG supply electric power variation amount DPmg0_s decreases from 0 as the MG torque candidate value Tmg_c decreases from 0, and the electric-power generation amount becomes larger than that in the case where the MG torque is 0 (refer to FIG. 9).

2-1-8. Total Supply Variation Amount Calculation Unit 208

As represented in the next equation, the total supply variation amount calculation unit 208 calculates, for each of the plurality of MG torque candidate values Tmg_c (for each of the respective candidate numbers i), a value obtained by subtracting the total supply power Psum_s[0] corresponding to the 0 MG-torque candidate value Tmg_c[0] from the total supply power Psum_s corresponding to the MG torque candidate value Tmg_c, as a 0 MG-torque-reference total supply power variation amount DPsum0_s.

$$DPsum0\_s[i]=Psum\_s[i]-Psum\_s[0] \quad (12)$$

At the power-running side, as the 0 MG-torque-reference total supply power variation amount DPsum0_s decreases from 0, the energy consumption amount in the overall engine MG becomes smaller than that in the case where the MG torque is 0 (refer to FIG. 8). In general, the power-running-side energy conversion efficiency of the MG is higher than the energy conversion efficiency of the engine; therefore, as the MG's power-running torque is increased, the engine torque whose conversion efficiency is low decreases, and hence the energy consumption amount in the overall engine MG decreases. At the power-generation side, as the 0 MG-torque-reference total supply power variation amount DPsum0_s increases from 0, the energy consumption amount in the overall engine MG becomes larger than that in the case where the MG torque is 0 (refer to FIG. 9). In general, the power-generation-side energy conversion efficiency of the MG is higher than the energy conversion efficiency of the engine; therefore, as the MG's power-generation torque is decreased, the engine torque whose conversion efficiency is low increases, and hence the energy consumption amount in the overall engine MG increases.

2-1-9. Supply Variation Amount Ratio Calculation Unit 209

The supply variation amount ratio calculation unit 209 calculates, for each of the plurality of MG torque candidate values Tmg_c (for each of the respective candidate numbers i), a relative supply power variation amount ratio RDP0_s, which is a ratio of the 0 MG-torque-reference engine fuel power variation amount DPeng0_s corresponding to the MG torque candidate value Tmg_c to the 0 MG-torque-reference MG supply electric power variation amount DPmg0_s corresponding to the MG torque candidate value Tmg_c.

$$RDP0\_s[i]=DPeng0\_s[i]/(DPmg0\_s[i]\times-1) \quad (13)$$

The multiplication by "−1" makes the relative supply power variation amount ratio RDP0_s become a positive value at both the power-running side and the power-generation side, i.e., a value equivalent to the absolute value. At the power-running side, as the relative supply power variation amount ratio RDP0_s increases, the ratio of the decrease amount of the consumed fuel energy in the engine to the increase amount of the power consumption amount in the MG increases; thus, it is suggested that an increase in the MG's power-running torque can efficiently reduce the fuel consumption in the engine. Therefore, at the power-running side, it is desirable that the relative supply power variation amount ratio RDP0_s is as large as possible (refer to FIG. 8). At the power-generation side, as the relative supply power variation amount ratio RDP0_s decreases, the ratio of the increase amount of the consumed fuel energy in the engine to the increase amount of the electric-power generation amount in the MG decreases; thus, it is suggested that an increase in the fuel consumption in the engine can efficiently increase the MG's power-generation amount. Therefore, at the power-generation side, it is desirable that the relative supply power variation amount ratio RDP0_s is as small as possible (refer to FIG. 9).

2-1-10. Demand Torque Selection Unit 210

2-1-10-1. Power-Running-Side Selection

Among the plurality of power-running-side MG torque candidate values Tmg_c that are the same as or larger than 0, the demand torque selection unit 210 selects MG torque candidate values Tmg_c that make the 0 MG-torque-reference total supply power variation amount DPsum0_s become the same as or smaller than a power-running-side variation amount upper limit value UPDP_sm that is set to be the same as or smaller than 0; then among the selected MG torque candidate values Tmg_c, the demand torque selection unit 210 selects, as a power-running-side final MG torque candidate value Tmg_cfm, an MG torque candidate value Tmg_c that makes the absolute value of the relative supply power variation amount ratio RDP0_s become maximum.

In this configuration, by power running of the MG, rather than the case where the MG torque is 0, it is possible to select the MG torque candidate value Tmg_c that makes the energy consumption amount in the overall engine MG become lower than the power-running-side variation amount upper limit value UPDP_sm (refer to FIG. 8). As described above, in general, as the MG's power-running torque is increased, the engine torque whose conversion efficiency is low decreases and hence the energy consumption amount in the overall engine MG decreases. Accordingly, by decreasing the power-running-side variation amount upper limit value UPDP_sm, the minimum value of the MG torque candidate value Tmg_c to be selected can be increased; thus, small power-running torque can be excluded from the selection. By increasing the power-running-side variation amount upper limit value UPDP_sm, the minimum value of the MG torque candidate value Tmg_c to be selected can be made smaller; thus, small power-running torque can be included in the selection. Accordingly, based on the selection utilizing the power-running-side variation amount upper limit value UPDP_sm, by setting at least to what extent the energy consumption amount in the overall engine MG is reduced by the power-running torque, it is possible to set at least to what extent the power-running torque is increased.

Then, by selecting, among the selected MG torque candidate values Tmg_c, the MG torque candidate value Tmg_c that makes the absolute value of the relative supply power variation amount ratio RDP0_s become maximum, it is possible to select, among the selected MG torque candidate values Tmg_c, the MG torque candidate value Tmg_c that makes it possible that the fuel consumption in the engine is most efficiently reduced by increasing the MG's power-running torque, as the power-running-side final MG torque candidate value Tmg_cfm.

In the present embodiment, among the plurality of power-running-side MG torque candidate values Tmg_c which are the same as or larger than 0, the demand torque selection unit 210 selects the MG torque candidate values Tmg_c that make the 0 MG-torque-reference total supply power variation amount DPsum0_s become the same as or smaller than the power-running-side variation amount upper limit value UPDP_sm and make the MG torque candidate values Tmg_c become the same as or smaller than the power-running-side MG torque upper limit value UPTmg_m which is set to be the same as or larger than 0; then, among the selected MG torque candidate values Tmg_c, the demand torque selection unit 210 selects, as the power-running-side final MG torque candidate value Tmg_cfm, the MG torque candidate value Tmg_c that makes the absolute value of the relative supply power variation amount ratio RDP0_s become maximum.

This configuration further makes it possible that the selected MG torque candidate values Tmg_c are limited so as to be the same as or smaller than the power-running-side MG torque upper limit value UPTmg_m, so that the upper limit of the power-running torque can be set (refer to FIG. 8). Moreover, the discharge current of the electric storage device 105 can be limited.

In the case where the power-running-side MG torque candidate value Tmg_c that satisfies the condition does not exist, the power-running-side final MG torque candidate value Tmg_cfm is neither selected nor existing.

<Change in Threshold Value Corresponding to SOC>

Figure 6:
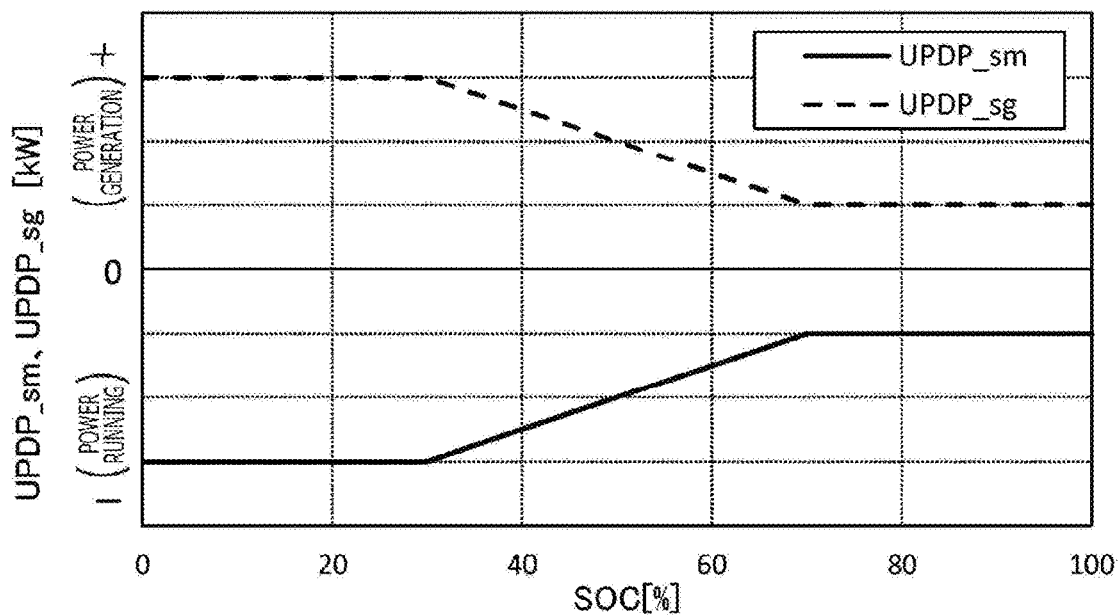
FIG. 6 is a graph for explaining setting data on a power-running-side variation amount upper limit value and a power-generation-side variation amount upper limit value according to Embodiment 1.

In the present embodiment, the demand torque selection unit 210 makes the power-running-side variation amount upper limit value UPDP_sm decrease as the charging amount SOC of the electric storage device 105 decreases. The demand torque selection unit 210 refers to a map data, represented in an example in FIG. 6, in which the relationship between the charging amount SOC and the power-running-side variation amount upper limit value UPDP_sm is preliminarily set, and then calculates the power-running-side variation amount upper limit value UPDP_sm corresponding to the present charging amount SOC.

As described above, the charging amount SOC is estimated based on the charging and discharging currents of the electric storage device 105 and is the ratio of the charging amount to the charging capacity of the electric storage device 105. As described above, in the case where the charging amount SOC is small, by decreasing the power-running-side variation amount upper limit value UPDP_sm, the condition that the 0 MG-torque-reference total supply power variation amount DPsum0_s is the same as or smaller than the power-running-side variation amount upper limit value UPDP_sm is hardly satisfied and the period in which the condition is satisfied is shortened, i.e., the power-running period is shortened; thus, the energy consumption amount can be reduced. In contrast, in the case where the charging amount SOC is large, by increasing the power-running-side variation amount upper limit value UPDP_sm, the condition that the 0 MG-torque-reference total supply power variation amount DPsum0_s is the same as or smaller than the power-running-side variation amount upper limit value UPDP_sm is readily satisfied and the period in which the condition is satisfied is prolonged, i.e., the power-running period is prolonged; thus, the fuel consumption in the engine can efficiently be reduced.

Figure 7:
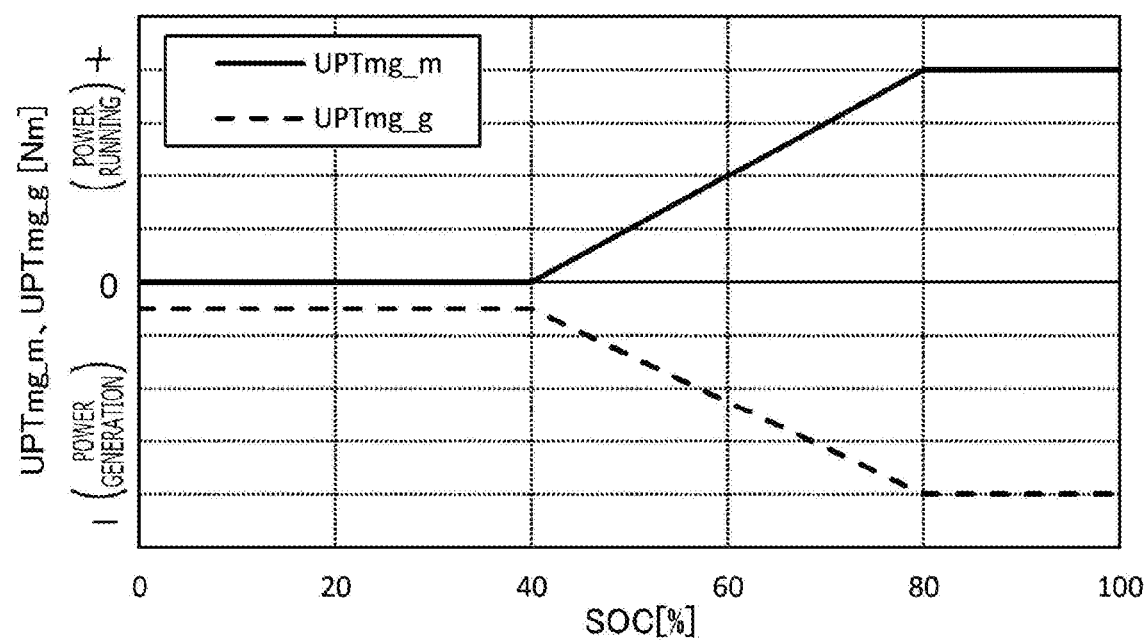
FIG. 7 is a graph for explaining setting data on a power-running-side MG torque upper limit value and a power-generation-side MG torque upper limit value according to Embodiment 1.

The demand torque selection unit 210 makes the power-running-side MG torque upper limit value UPTmg_m decrease as the charging amount SOC of the electric storage device 105 decreases. The demand torque selection unit 210 refers to a map data, represented in an example in FIG. 7, in which the relationship between the charging amount SOC and the power-running-side MG torque upper limit value UPTmg_m is preliminarily set, and then calculates the power-running-side MG torque upper limit value UPTmg_m corresponding to the present charging amount SOC.

When the power-running-side MG torque upper limit value UPTmg_m is decreased, the maximum value of the MG torque candidate value Tmg_c to be selected becomes smaller. Accordingly, in the case where the charging amount SOC is small, excessive discharging from the electric storage device 105 can be suppressed by excluding large power-running torque from the selection. In the case where the charging amount SOC is large, large power-running torque is included in the selection so that the discharge current of the electric storage device 105 is increased, the energy consumption amount in the overall engine MG can be reduced. Therefore, in the case where the charging amount SOC is small, excessive discharging from the electric storage device 105 can be prevented, and in the case where the charging amount SOC is large, the energy consumption amount can be reduced.

In the case where the charging amount SOC becomes the same as or smaller than a preliminarily set power-running prohibition charging amount (in the example in FIG. 7, 40%), the demand torque selection unit 210 decreases the power-running-side MG torque upper limit value UPTmg_m to 0. When the power-running-side MG torque upper limit value UPTmg_m becomes 0, there is no power-running-side MG torque candidate value Tmg_c to be selected, and hence the power-running-side final MG torque candidate value Tmg_cfm does not exist. Therefore, it is made possible that when the charging amount SOC decreases, the MG is prohibited from performing power-running operation and is made to perform power-generation operation; thus, the electric storage device 105 can be suppressed from being excessively discharged.

<Behavior of Power-Running-Side Selection Processing>

An example of behavior of power-running-side demand torque selection processing will be explained by use of FIG. 8. The MG torque candidate value Tmg_c is incremented in steps of 1 from 0 to 10. As the MG torque candidate value Tmg_c increases from 0, the engine supply fuel power Peng_s decreases and the MG supply electric power Pmg_s increases. Because the engine torque whose energy conversion efficiency is low decreases and the MG torque whose energy conversion efficiency is high increases, the energy conversion efficiency in the overall engine MG is raised; thus, the total supply power Psum_s decreases.

Accordingly, the 0 MG-torque-reference total supply power variation amount DPsum0_s decreases from 0 as the MG torque candidate value Tmg_c increases from 0. The relative supply power variation amount ratio RDP0_s temporarily increases and then decreases, as the MG torque candidate value Tmg_c increases from 0. This is because, as represented in FIG. 4, when the engine torque is changed even at the same rotation speed, the fuel consumption rate Feng of the engine changes, and as represented in FIG. 5, when the MG torque is changed even at the same rotation speed, the conversion efficiency Fmg of the MG changes, and hence the relative supply power variation amount ratio RDP0_s increases or decreases depending on the balance between the fuel consumption rate Feng of the engine and the conversion efficiency Fmg of the MG. As the relative supply power variation amount ratio RDP0_s increases, the ratio of the decrease amount of the consumed fuel energy in the engine to the increase amount of the power consumption amount in the MG increases; thus, an increase in the MG's power-running torque can efficiently reduce the fuel consumption in the engine.

Among the plurality of power-running-side MG torque candidate values Tmg_c, there is selected the MG torque candidate value Tmg_c of 4 [Nm] or larger that makes the 0 MG-torque-reference total supply power variation amount DPsum0_s become the same as or smaller than the power-running-side variation amount upper limit value UPDP_sm. By the selection utilizing the power-running-side variation amount upper limit value UPDP_sm, it is possible to set at least to what extent the energy consumption amount in the overall engine MG is reduced. If the power-running-side MG torque upper limit value UPTmg_m is decreased as the charging amount SOC decreases, it is made possible that in the case where the charging amount SOC is small, large power-running torque is excluded from the selection so that the excessive discharging of the electric storage device 105 is suppressed, and that in the case where the charging amount SOC is large, the large power-running torque is included in the selection so that the discharge current of the electric storage device 105 is increased; thus, the energy consumption amount in the overall engine MG can be reduced.

Furthermore, because there is selected the MG torque candidate value Tmg_c of 8 [Nm] or smaller that makes the MG torque candidate value Tmg_c become the same as or smaller than the power-running-side MG torque upper limit value UPTmg_m, it is made possible to set the upper limit of the power-running torque. If the power-running-side MG torque upper limit value UPTmg_m is decreased as the charging amount SOC of the electric storage device 105 decreases, it is made possible that in the case where the charging amount SOC is small, large power-running torque is excluded from the selection so that the excessive discharging of the electric storage device 105 is suppressed, and that in the case where the charging amount SOC is large, the large power-running torque is included in the selection so that the discharge current of the electric storage device 105 is increased; thus, the energy consumption amount in the overall engine MG can be reduced.

Then, among the selected MG torque candidate values Tmg_c, there is selected, as the power-running-side final MG torque candidate value Tmg_cfm, the MG torque candidate value Tmg_c of 6 [Nm] that makes the relative supply power variation amount ratio RDP0_s become maximum. Thus, among the selected MG torque candidate values Tmg_c, there can be selected, as the power-running-side final MG torque candidate value Tmg_cfm, the MG torque candidate value Tmg_c that makes it possible that the fuel consumption in the engine is most efficiently reduced by increasing the MG's power-running torque.

2-1-10-2. Power-Generation-Side Selection

Among the plurality of power-generation-side MG torque candidate values Tmg_c of 0 or smaller, the demand torque selection unit 210 selects the MG torque candidate values Tmg_c that make 0 MG-torque-reference total supply power variation amount DPsum0_s become the same as or smaller than a power-generation-side variation amount upper limit value UPDP_sg that is set to be the same as or larger than 0; then, among the selected MG torque candidate values Tmg_c, the demand torque selection unit 210 selects, as a power-generation-side final MG torque candidate value Tmg_cfg, an MG torque candidate value Tmg_c that makes the absolute value of the relative supply power variation amount ratio RDP0_s become minimum.

In this configuration, by power generation of the MG, rather than the case where the MG torque is 0, it is possible to select the MG torque candidate value Tmg_c that makes the energy consumption amount in the overall engine MG increase below the power-generation-side variation amount upper limit value UPDP_sg (refer to FIG. 9). As described above, in general, as the MG's power-generation torque is decreased, the engine torque whose conversion efficiency is low increases and hence the energy consumption amount in the overall engine MG increases. Accordingly, by increasing the power-generation-side variation amount upper limit value UPDP_sg, the minimum value of the MG torque candidate value Tmg_c to be selected can be decreased; thus, small power-generation torque can be included in the selection. By decreasing the power-generation-side variation amount upper limit value UPDP_sg, the minimum value of the MG torque candidate value Tmg_c to be selected can be increased; thus, small power-generation torque can be excluded from the selection. Accordingly, based on the selection utilizing the power-generation-side variation amount upper limit value UPDP_sg, by setting at least to what extent the energy consumption amount in the overall engine MG is reduced by the power-generation torque, it is made possible to set at least to what extent the power-running torque is decreased. Moreover, the charging current of the electric storage device 105 can be limited.

Then, by selecting the MG torque candidate values that make the absolute value of the relative supply power variation amount ratio RDP0_s become minimum, it is possible to select, among the selected MG torque candidate values Tmg_c, the MG torque candidate value Tmg_c that makes it possible that the MG's power-generation amount is most efficiently increased by increasing the fuel consumption in the engine, as the power-generation-side final MG torque candidate value Tmg_cfg.

In the present embodiment, among the plurality of power-generation-side MG torque candidate values Tmg_c that are the same as or smaller than 0, the demand torque selection unit 210 selects the MG torque candidate values Tmg_c that make the 0 MG-torque-reference total supply power variation amount DPsum0_s become the same as or smaller than the power-generation-side variation amount upper limit value UPDP_sg and make the MG torque candidate values Tmg_c become the same as or smaller than a power-generation-side MG torque upper limit value UPTmg_g which is set to be the same as or smaller than 0; then, among the selected MG torque candidate values Tmg_c, the demand torque selection unit 210 selects, as the power-generation-side final MG torque candidate value Tmg_cfg, the MG torque candidate value Tmg_c that makes the absolute value of the relative supply power variation amount ratio RDP0_s become minimum.

Figure 9:
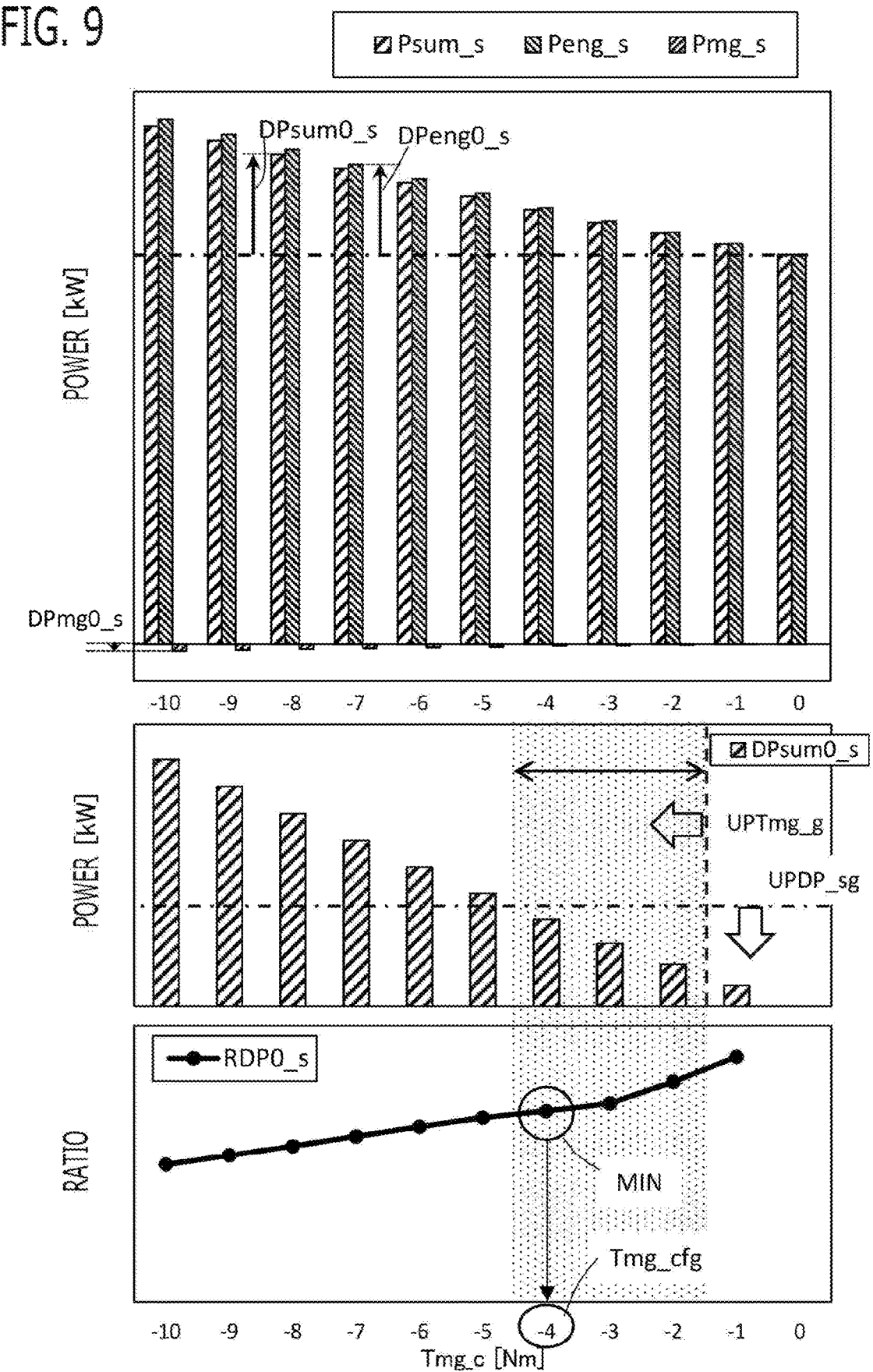
FIG. 9 is a set of charts for explaining the behavior of power-generation-side demand torque selection processing according to Embodiment 1.

This configuration further makes it possible that the selected MG torque candidate values Tmg_c are limited so as to be the same as or smaller than the power-generation-side MG torque upper limit value UPTmg_g, so that the upper limit of the power-generation torque can be set (refer to FIG. 9).

In the case where the power-generation-side MG torque candidate value Tmg_c that satisfies the condition does not exist, the power-generation-side final MG torque candidate value Tmg_cfg is neither selected nor existing.

<Change in Threshold Value Corresponding to SOC>

In the present embodiment, the demand torque selection unit 210 makes the power-generation-side variation amount upper limit value UPDP_sg increase as the charging amount SOC of the electric storage device 105 decreases. The demand torque selection unit 210 refers to a map data, represented in an example in FIG. 6, in which the relationship between the charging amount SOC and the power-generation-side variation amount upper limit value UPDP_sg is preliminarily set, and then calculates the power-generation-side variation amount upper limit value UPDP_sg corresponding to the present charging amount SOC.

As described above, by increasing the power-generation-side variation amount upper limit value UPDP_sg, the minimum value of the MG torque candidate value Tmg_c to be selected can be decreased; thus, small power-generation torque can be included in the selection. Accordingly, in the case where the charging amount SOC is small, the charging current of the electric storage device 105 can be increased by including small power-generation torque in the selection. In contrast, in the case where the charging amount SOC is large, small power-generation torque is excluded from the selection so that the charging current of the electric storage device 105 is increased, the energy consumption amount in the overall engine MG can be suppressed. Therefore, it is made possible that in the case where the charging amount SOC is small, the charging current of the electric storage device 105 is increased, and that in the case where the charging amount SOC is large, power generation is prevented from increasing the energy consumption amount.

The demand torque selection unit 210 makes the power-generation-side MG torque upper limit value UPTmg_g increase as the charging amount SOC of the electric storage device 105 decreases. The demand torque selection unit 210 refers to a map data, represented in the example in FIG. 7, in which the relationship between the charging amount SOC and the power-generation-side MG torque upper limit value UPTmg_g is preliminarily set, and then calculates the power-generation-side MG torque upper limit value UPTmg_g corresponding to the present charging amount SOC.

When the power-generation-side MG torque upper limit value UPTmg_g is increased, the range of the MG torque candidate value Tmg_c to be selected becomes wider. Accordingly, in the case where the charging amount SOC is small, the charging period of the electric storage device 105 can be prolonged by including power-generation torque having a large value close to 0 in the selection so that the charging condition is readily satisfied. In the case where the charging amount SOC is large, power-generation torque having a large value close to 0 is excluded from the selection so that the charging condition is hardly satisfied, the charging period of the electric storage device 105 is shortened and hence the energy consumption amount in the overall engine MG can be suppressed from increasing. Therefore, it is made possible that in the case where the charging amount SOC is small, the charging period of the electric storage device 105 is prolonged, and that in the case where the charging amount SOC is large, power generation is prevented from increasing the energy consumption amount.

In the case where the charging amount SOC becomes the same as or larger than a preliminarily set power-generation prohibition charging amount (in the example in FIG. 7, 80%), the demand torque selection unit 210 decreases the power-generation-side MG torque upper limit value UPTmg_g to the power-generation-side lower limit torque Tmg_min. When the power-generation-side MG torque upper limit value UPTmg_g becomes the power-generation-side lower limit torque Tmg_min, there is no power-generation-side MG torque candidate value Tmg_c to be selected, and hence the power-generation-side final MG torque candidate value Tmg_cfm does not exist. Therefore, it is made possible that when the charging amount SOC increases, the MG is prohibited from performing power-generation operation and is made to perform power-running operation; thus, the electric storage device 105 can be suppressed from being excessively charged.

<Behavior of Power-Generation-Side Selection Processing>

An example of behavior of power-generation-side demand torque selection processing will be explained by use of FIG. 9. The MG torque candidate value Tmg_c is decremented in steps of 1 from 0 to −10. As the MG torque candidate value Tmg_c decreases from 0, the MG supply electric power Pmg_s further decreases from 0 and the engine supply fuel power Peng_s increases. Because although supply power of the MG whose energy conversion efficiency is high decreases, supply power of the engine whose energy conversion efficiency is low increases, the energy conversion efficiency in the overall engine MG is deteriorated; thus, the total supply power Psum_s increases.

Accordingly, the 0 MG-torque-reference total supply power variation amount DPsum0_s increases from 0 as the MG torque candidate value Tmg_c decreases from 0. The relative supply power variation amount ratio RDP0_s decreases as the MG torque candidate value Tmg_c decreases from 0. As the relative supply power variation amount ratio RDP0_s decreases, the ratio of the increase amount of the consumed fuel energy in the engine to the increase amount of the electric-power generation amount in the MG decreases; thus, an increase in the fuel consumption in the engine can efficiently increase the MG's power-generation amount.

Among the plurality of power-generation-side MG torque candidate values Tmg_c, there is selected the MG torque candidate value Tmg_c of −4 [Nm] or larger that makes the 0 MG-torque-reference total supply power variation amount DPsum0_s become the same as or smaller than the power-generation-side variation amount upper limit value UPDP_sg. By the selection utilizing the power-generation-side variation amount upper limit value UPDP_sg, it is possible to set at least to what extent the energy consumption amount in the overall engine MG is increased. If the power-generation-side variation amount upper limit value UPDP_sg is increased as the charging amount SOC decreases, it is made possible that in the case where the charging amount SOC is small, small power-generation torque is included in the selection so that the charging current of the electric storage device 105 is increased, and that in the case where the charging amount SOC is large, the small power-generation torque is excluded from the selection so that the charging current of the electric storage device 105 is decreased; thus, the energy consumption amount in the overall engine MG can be suppressed.

Furthermore, because there is selected the MG torque candidate value Tmg_c of −2 [Nm] or smaller that makes the MG torque candidate value Tmg_c become the same as or smaller than the power-generation-side MG torque upper limit value UPTmg_g, it is made possible to set the upper limit of the power-generation torque. If the power-generation-side MG torque upper limit value UPTmg_g is increased as the charging amount SOC of the electric storage device 105 decreases, it is made possible that in the case where the charging amount SOC is small, power-generation torque having a large value close to 0 is included in the selection so that the charging period of the electric storage device 105 is prolonged, and that in the case where the charging amount SOC is large, the power-generation torque having a large value close to 0 is excluded from the selection so that the charging period of the electric storage device 105 is shortened; thus, the energy consumption amount in the overall engine MG can be suppressed.

Then, among the selected MG torque candidate values Tmg_c from −4 [Nm] to −2 [Nm], there is selected, as the power-generation-side final MG torque candidate value Tmg_cfg, the MG torque candidate value Tmg_c of −4 [Nm] that makes the relative supply power variation amount ratio RDP0_s become minimum. Therefore, among the selected MG torque candidate values Tmg_c, there can be selected, as the power-generation-side final MG torque candidate value Tmg_cfg, the MG torque candidate value Tmg_c that makes it possible that the MG's power-generation amount is most efficiently increased by increasing the fuel consumption in the engine.

2-1-10-3. Selection of Final Demand Torque

In the case where the power-running-side final MG torque candidate value Tmg_cfm exists and the power-generation-side final MG torque candidate value Tmg_cfg does not exist, the demand torque selection unit 210 sets the power-running-side final MG torque candidate value Tmg_cfm to a final MG demand torque Tmg_f.

In the case where the power-running-side final MG torque candidate value Tmg_cfm does not exist and the power-generation-side final MG torque candidate value Tmg_cfg exists, the demand torque selection unit 210 sets the power-generation-side final MG torque candidate value Tmg_cfg to the final MG demand torque Tmg_f.

In the case where both the power-running-side final MG torque candidate value Tmg_cfm and the power-generation-side final MG torque candidate value Tmg_cfg exist, the demand torque selection unit 210 sets one of the power-running-side final MG torque candidate value Tmg_cfm and the power-generation-side final MG torque candidate value Tmg_cfg, whose the 0 MG-torque-reference total supply power variation amount DPsum0_s becomes smaller than that of the other one, to the final MG demand torque Tmg_f.

In this configuration, in the case where both the power-running-side and power-generation-side final candidate values exist, there is finally selected the one of the power-running-side and power-generation-side final candidate values, whose the 0 MG-torque-reference total supply power variation amount DPsum0_s becomes smaller than that of the other one; thus, the energy consumption amount in the overall engine MG can further be reduced.

Then, as represented in the next equation, the demand torque selection unit 210 sets a value obtained by subtracting the final MG demand torque Tmg_f from the transmission shaft torque Tsum, to a final engine demand torque Teng_f.

$$Teng\_f = Tsum - Tmg\_f \qquad (14)$$

The demand torque selection unit 210 transfers the final MG demand torque Tmg_f to the MG control unit 213 of the MG controller 114. Then, as described above, the MG control unit 213 of the MG controller 114 performs on/off-control of the plurality of switching devices provided in the inverter and the switching device that performs on/off-switching of electric-power supply to the magnetic-field winding so that the MG 102 outputs the transferred demand torque Tmg_f.

The demand torque selection unit 210 transfers the final engine demand torque Teng_f to the engine control unit 211. Then, as described above, the engine control unit 211 calculates the intake air amount, the fuel injection amount, the ignition timing, and the like for realizing the transferred demand torque Teng_f, and then controls the electric throttle valve, the injector, the ignition coil, and the like so as to realize these amounts and the timing.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In foregoing Embodiment 1, as an example, there has been explained the case where the controller 106 includes the transmission shaft torque calculation unit 201 through the demand torque selection unit 210 in which engine demand torque and MG demand torque are calculated, the engine control unit 211 that controls the engine based on the engine demand torque, and the transmission control unit 212 that controls the transmission 104 and where the MG controller 114 has the MG control unit 213 that controls the MG based on the MG demand torque. However, embodiments of the present disclosure are not limited to the foregoing case. In other words, the transmission shaft torque calculation unit 201 through the demand torque selection unit 210, the engine control unit 211, the transmission control unit 212, and the MG control unit 213 may be provided, as an arbitrary combination, in a single controller or in a plurality of controllers. In the case where a plurality of controllers are provided, the controllers communicate control information such as demand torque to one another. For example, it may be allowed that the transmission shaft torque calculation unit 201 through the demand torque selection unit 210 are provided in a single controller and that the engine control unit 211, the transmission control unit 212, and the MG control unit 213 are provided in respective controllers. Alternatively, it may be allowed that the transmission shaft torque calculation unit 201 through the demand torque selection unit 210 are provided in a single controller, that the engine control unit 211 and the transmission control unit 212 are provided in a single controller, and that the MG control unit 213 is provided in a single controller.

(2) In foregoing Embodiment 1, as an example, there has been explained the case where the output axle 112 of the MG is coupled with the crankshaft 111 of the engine 101 through the intermediary of the pulley belt mechanism 113 and where the crankshaft 111 is a transmission shaft for which the transmission shaft torque Tsum is calculated. However, embodiments of the present disclosure are not limited to the foregoing case. That is to say, it is only necessary that the hybrid vehicle has a rotation-axle body to which each of the engine 101 and the MG 102 transfers driving power, and it may be allowed that each of the coupling mechanism between the rotation-axle body and the engine 101 and the coupling mechanism between the rotation-axle body and the MG 102 is an arbitrary mechanism. Moreover, it may be allowed that any one of the respective rotation-axle bodies to which engine 101 and the MG 102 transfer driving power is a transmission shaft for which the transmission shaft torque Tsum is calculated. For example, it may be allowed that the rotor of the MG is coupled with the coupling portion between the crankshaft 111 of the engine and the transmission 104 in such a way as to rotate integrally with the coupling portion; the coupling portion may be the transmission shaft.

(3) It may be allowed that as the electric storage device 105, a low-voltage electric storage device such as a lead-acid battery of 14V, a high-voltage electric storage device such as a lithium ion battery of 48V, and a DC power conversion apparatus that performs voltage conversion between the high voltage and the low voltage are provided; the MG 102 may be connected with either the low-voltage electric storage device or the high-voltage electric storage device.

Although the present disclosure is described above in terms of an exemplary embodiment, it should be understood that the various features, aspects and functions described in the embodiment are not limited in their applicability to the particular embodiment with which they are described, but instead can be applied, alone or in various combinations to the embodiment. It is therefore understood that numerous modifications which have not been exemplified can be devised without departing from the scope of the technology disclosed in the specification of the present disclosure. For example, at least one of the constituent components may be modified, added, or eliminated.

What is claimed is:

1. A hybrid-vehicle controller that controls a hybrid vehicle having an engine and a motor generator as a driving power source for wheels, the hybrid-vehicle controller comprising at least one processor configured to implement:
   a transmission shaft torque calculator that calculates transmission shaft torque, which is a demand torque to be transferred from the engine and the motor generator to a transmission shaft that is coupled with the wheels;
   a torque candidate value setter that sets a plurality of MG torque candidate values including 0, which are power-running-side demand torque candidate values for the motor generator, and sets respective engine torque candidate values, which are engine demand torque candidate values for realizing the transmission shaft torque, for the plurality of MG torque candidate values;
   an engine supply power calculator that calculates, for each of the plurality of MG torque candidate values, an engine supply fuel power, which is a power of a fuel that is supplied to the engine for realizing the engine torque candidate value corresponding to the MG torque candidate value, based on a present rotation speed of the engine and a fuel consumption rate of the engine;
   an MG supply power calculator that calculates, for each of the plurality of MG torque candidate values, an MG supply electric power, which is an electric energy that is converted by the motor generator for realizing the MG torque candidate value, based on a present rotation speed of the motor generator and a conversion efficiency of the motor generator;
   a total supply power calculator that calculates, for each of the plurality of MG torque candidate values, a value obtained by summing up the MG supply electric power corresponding to the MG torque candidate value and the engine supply fuel power corresponding to the MG torque candidate value, as a total supply power;
   an engine supply variation amount calculator that calculates, for each of the plurality of MG torque candidate values, a value obtained by subtracting the engine supply fuel power corresponding to the 0 MG-torque candidate value from the engine supply fuel power corresponding to the MG torque candidate value, as a 0 MG-torque-reference engine supply fuel power variation amount;
   an MG supply variation amount calculator that calculates, for each of the plurality of MG torque candidate values, a value obtained by subtracting the MG supply electric power corresponding to the 0 MG-torque candidate value from the MG supply electric power corresponding to the MG torque candidate value, as a 0 MG-torque-reference MG supply electric power variation amount;
   a total supply variation amount calculator that calculates, for each of the plurality of MG torque candidate values, a value obtained by subtracting the total supply power corresponding to the 0 MG-torque candidate value from the total supply power corresponding to the MG torque candidate value, as a 0 MG-torque-reference total supply power variation amount;
   a supply variation amount ratio calculator that calculates, for each of the plurality of MG torque candidate values, a relative supply power variation amount ratio, which is a ratio of the 0 MG-torque-reference engine supply fuel power variation amount corresponding to the MG torque candidate value to the 0 MG-torque-reference MG supply electric power variation amount corresponding to the MG torque candidate value; and
   a demand torque selector that selects the MG torque candidate values that make the 0 MG-torque-reference total supply power variation amount become the same as or smaller than a power-running-side variation amount upper limit value, among the plurality of power-running-side MG torque candidate values; selects, as a power-running-side final MG torque candidate value, the MG torque candidate value that makes an absolute value of the relative supply power variation amount ratio become maximum, among the selected MG torque candidate values; sets the power-running-side final MG torque candidate value to a final demand torque for the motor generator; and sets, as a final demand torque for the engine, a value obtained by subtracting the final demand torque for the motor generator from the transmission shaft torque.

2. A hybrid-vehicle controller that controls a hybrid vehicle having an engine and a motor generator as a driving power source for wheels, the hybrid-vehicle controller comprising at least one processor configured to implement:
   a transmission shaft torque calculator that calculates a transmission shaft torque, which is a demand torque to be transferred from the engine and the motor generator to a wheels-side transmission shaft;
   a torque candidate value setter that sets a plurality of MG torque candidate values including 0, which are power-generation-side demand torque candidate values for the motor generator, and sets respective engine torque candidate values, which are engine demand torque candidate values for realizing the transmission shaft torque, for the plurality of MG torque candidate values;
   an engine supply power calculator that calculates, for each of the plurality of MG torque candidate values, an engine supply fuel power, which is a power of a fuel that is supplied to the engine for realizing the engine torque candidate value corresponding to the MG torque candidate value, based on a present rotation speed of the engine and a fuel consumption rate of the engine;
an MG supply power calculator that calculates, for each of the plurality of MG torque candidate values, an MG supply electric power, which is an electric energy that is converted by the motor generator for realizing the MG torque candidate value, based on a present rotation speed of the motor generator and a conversion efficiency of the motor generator;
a total supply power calculator that calculates, for each of the plurality of MG torque candidate values, a value obtained by summing up the MG supply electric power corresponding to the MG torque candidate value and the engine supply fuel power corresponding to the MG torque candidate value, as a total supply power;
an engine supply variation amount calculator that calculates, for each of the plurality of MG torque candidate values, a value obtained by subtracting the engine supply fuel power corresponding to the 0 MG-torque candidate value from the engine supply fuel power corresponding to the MG torque candidate value, as a 0 MG-torque-reference engine supply fuel power variation amount;
an MG supply variation amount calculator that calculates, for each of the plurality of MG torque candidate values, a value obtained by subtracting the MG supply electric power corresponding to the 0 MG-torque candidate value from the MG supply electric power corresponding to the MG torque candidate value, as a 0 MG-torque-reference MG supply electric power variation amount;
a total supply variation amount calculator that calculates, for each of the plurality of MG torque candidate values, a value obtained by subtracting the total supply power corresponding to the 0 MG-torque candidate value from the total supply power corresponding to the MG torque candidate value, as a 0 MG-torque-reference total supply power variation amount;
a supply variation amount ratio calculator that calculates, for each of the plurality of MG torque candidate values, a relative supply power variation amount ratio, which is a ratio of the 0 MG-torque-reference engine supply fuel power variation amount corresponding to the MG torque candidate value to the 0 MG-torque-reference MG supply electric power variation amount corresponding to the MG torque candidate value; and
a demand torque selector that selects the MG torque candidate values that make the 0 MG-torque-reference total supply power variation amount become the same as or smaller than a power-generation-side variation amount upper limit value, among the plurality of power-generation-side MG torque candidate values; selects, as a power-generation-side final MG torque candidate value, the MG torque candidate value that makes an absolute value of the relative supply power variation amount ratio become minimum, among the selected MG torque candidate values; sets the power-generation-side final MG torque candidate value to a final demand torque for the motor generator; and sets, as a final demand torque for the engine, a value obtained by subtracting the final demand torque for the motor generator from the transmission shaft torque.

3. A hybrid-vehicle controller that controls a hybrid vehicle having an engine and a motor generator as a driving power source for wheels, the hybrid-vehicle controller comprising at least one processor configured to implement:
a transmission shaft torque calculator that calculates a transmission shaft torque, which is a demand torque to be transferred from the engine and the motor generator to a wheels-side transmission shaft;
a torque candidate value setter that sets a plurality of MG torque candidate values including 0, which are power-running-side and power-generation-side demand torque candidate values for the motor generator, and sets respective engine torque candidate values, which are engine demand torque candidate values for realizing the transmission shaft torque, for the plurality of MG torque candidate values;
an engine supply power calculator that calculates, for each of the plurality of MG torque candidate values, an engine supply fuel power, which is a power of a fuel that is supplied to the engine for realizing the engine torque candidate value corresponding to the MG torque candidate value, based on a present rotation speed of the engine and a fuel consumption rate of the engine;
an MG supply power calculator that calculates, for each of the plurality of MG torque candidate values, an MG supply electric power, which is an electric energy that is converted by the motor generator for realizing the MG torque candidate value, based on a present rotation speed of the motor generator and a conversion efficiency of the motor generator;
a total supply power calculator that calculates, for each of the plurality of MG torque candidate values, a value obtained by summing up the MG supply electric power corresponding to the MG torque candidate value and the engine supply fuel power corresponding to the MG torque candidate value, as a total supply power;
an engine supply variation amount calculator that calculates, for each of the plurality of MG torque candidate values, a value obtained by subtracting the engine supply fuel power corresponding to the 0 MG-torque candidate value from the engine supply fuel power corresponding to the MG torque candidate value, as a 0 MG-torque-reference engine supply fuel power variation amount;
an MG supply variation amount calculator that calculates, for each of the plurality of MG torque candidate values, a value obtained by subtracting the MG supply electric power corresponding to the 0 MG-torque candidate value from the MG supply electric power corresponding to the MG torque candidate value, as a 0 MG-torque-reference MG supply electric power variation amount;
a total supply variation amount calculator that calculates, for each of the plurality of MG torque candidate values, a value obtained by subtracting the total supply power corresponding to the 0 MG-torque candidate value from the total supply power corresponding to the MG torque candidate value, as a 0 MG-torque-reference total supply power variation amount;
a supply variation amount ratio calculator that calculates, for each of the plurality of MG torque candidate values, a relative supply power variation amount ratio, which is a ratio of the 0 MG-torque-reference engine supply fuel power variation amount corresponding to the MG torque candidate value to the 0 MG-torque-reference MG supply electric power variation amount corresponding to the MG torque candidate value; and
a demand torque selector that selects the MG torque candidate values that make the 0 MG-torque-reference total supply power variation amount become the same as or smaller than a power-running-side variation amount upper limit value, among the plurality of power-running-side MG torque candidate values; selects, as a power-running-side final MG torque candidate value, the MG torque candidate value that makes an absolute value of the relative supply power variation amount ratio become maximum, among the selected MG torque candidate values; selects the MG torque candidate values that make the 0 MG-torque-reference total supply power variation amount become the same as or smaller than a power-generation-side variation amount upper limit value, among the plurality of power-generation-side MG torque candidate values; selects, as a power-generation-side final MG torque candidate value, the MG torque candidate value that makes an absolute value of the relative supply power variation amount ratio become minimum, among the selected MG torque candidate values; sets one of the power-running-side final MG torque candidate value and the power-generation-side final MG torque candidate value, whose the 0 MG-torque-reference total supply power variation amount becomes smaller than that of the other one, to a final demand torque for the motor generator; and sets, as a final demand torque for the engine, a value obtained by subtracting the final demand torque for the motor generator from the transmission shaft torque.

4. The hybrid-vehicle controller according to claim 1, wherein the demand torque selector selects the MG torque candidate values that make the 0 MG-torque-reference total supply power variation amount become the same as or smaller than the power-running-side variation amount upper limit value and make the MG torque candidate value become the same as or smaller than a power-running-side MG torque upper limit value, among the plurality of power-running-side MG torque candidate values; and then selects, as the power-running-side final MG torque candidate value, the MG torque candidate value that makes the absolute value of the relative supply power variation amount ratio become maximum, among the selected MG torque candidate values.

5. The hybrid-vehicle controller according to claim 3, wherein the demand torque selector selects the MG torque candidate values that make the 0 MG-torque-reference total supply power variation amount become the same as or smaller than the power-running-side variation amount upper limit value and make the MG torque candidate value become the same as or smaller than a power-running-side MG torque upper limit value, among the plurality of power-running-side MG torque candidate values; and then selects, as the power-running-side final MG torque candidate value, the MG torque candidate value that makes the absolute value of the relative supply power variation amount ratio become maximum, among the selected MG torque candidate values.

6. The hybrid-vehicle controller according to claim 2, wherein the demand torque selector selects the MG torque candidate values that make the 0 MG-torque-reference total supply power variation amount become the same as or smaller than the power-generation-side variation amount upper limit value and make the MG torque candidate value become the same as or smaller than a power-generation-side MG torque upper limit value, among the plurality of power-generation-side MG torque candidate values; and then selects, as the power-generation-side final MG torque candidate value, the MG torque candidate value that makes the absolute value of the relative supply power variation amount ratio become minimum, among the selected MG torque candidate values.

7. The hybrid-vehicle controller according to claim 3, wherein the demand torque selector selects the MG torque candidate values that make the 0 MG-torque-reference total supply power variation amount become the same as or smaller than the power-generation-side variation amount upper limit value and make the MG torque candidate value become the same as or smaller than a power-generation-side MG torque upper limit value, among the plurality of power-generation-side MG torque candidate values; and then selects, as the power-generation-side final MG torque candidate value, the MG torque candidate value that makes the absolute value of the relative supply power variation amount ratio become minimum, among the selected MG torque candidate values.

8. The hybrid-vehicle controller according to claim 1, wherein the demand torque selector makes the power-running-side variation amount upper limit value decrease as a charging amount of an electric storage device that exchanges electric energy with the motor generator decreases.

9. The hybrid-vehicle controller according to claim 3, wherein the demand torque selector makes the power-running-side variation amount upper limit value decrease as a charging amount of an electric storage device that exchanges electric energy with the motor generator decreases.

10. The hybrid-vehicle controller according to claim 4, wherein the demand torque selector makes the power-running-side variation amount upper limit value decrease as a charging amount of an electric storage device that exchanges electric energy with the motor generator decreases.

11. The hybrid-vehicle controller according to claim 4, wherein the demand torque selector makes the power-running-side MG torque upper limit value decrease as a charging amount of an electric storage device that exchanges electric energy with the motor generator decreases.

12. The hybrid-vehicle controller according to claim 5, wherein the demand torque selector makes the power-running-side MG torque upper limit value decrease as a charging amount of an electric storage device that exchanges electric energy with the motor generator decreases.

13. The hybrid-vehicle controller according to claim 2, wherein the demand torque selector makes the power-generation-side variation amount upper limit value increase as a charging amount of an electric storage device that exchanges electric energy with the motor generator decreases.

14. The hybrid-vehicle controller according to claim 3, wherein the demand torque selector makes the power-generation-side variation amount upper limit value increase as a charging amount of an electric storage device that exchanges electric energy with the motor generator decreases.

15. The hybrid-vehicle controller according to claim 6, wherein the demand torque selector makes the power-generation-side variation amount upper limit value increase as a charging amount of an electric storage device that exchanges electric energy with the motor generator decreases.

16. The hybrid-vehicle controller according to claim 7, wherein the demand torque selector makes the power-generation-side variation amount upper limit value increase as a charging amount of an electric storage device that exchanges electric energy with the motor generator decreases.

17. The hybrid-vehicle controller according to claim 6, wherein the demand torque selector makes the power-generation-side MG torque upper limit value increase as a charging amount of an electric storage device that exchanges electric energy with the motor generator decreases.

18. The hybrid-vehicle controller according to claim 7, wherein the demand torque selector makes the power-generation-side MG torque upper limit value increase as a charging amount of an electric storage device that exchanges electric energy with the motor generator decreases.

* * * * *